US012658209B1

(12) United States Patent
Suzuki

(10) Patent No.: US 12,658,209 B1
(45) Date of Patent: Jun. 16, 2026

(54) MAGNETIC RECORDING MEDIA AND METHODS AND APPARATUS FOR IDENTIFYING SUBSTRATES SUITABLE FOR MAGNETIC RECORDING MEDIA

(71) Applicant: Western Digital Technologies, Inc., San Jose, CA (US)

(72) Inventor: Shoji Suzuki, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 19/050,798

(22) Filed: Feb. 11, 2025

(51) Int. Cl.
*G11B 5/84* (2006.01)
*G11B 5/00* (2006.01)

(52) U.S. Cl.
CPC ........ *G11B 5/84* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 6,408,677 B1* | 6/2002 | Suzuki ................... | G11B 33/10 |
| | | | 73/1.89 |
| 9,105,293 B2 | 8/2015 | Kitsunai et al. | |
| 2002/0164505 A1 | 11/2002 | Yokoyama et al. | |
| 2003/0086347 A1* | 5/2003 | Kobayashi ............. | G11B 19/12 |
| | | | 369/53.22 |
| 2004/0146749 A1 | 7/2004 | Takahashi | |

| | | | |
|---|---|---|---|
| 2005/0032465 A1* | 2/2005 | Fujii ................... | G11B 5/73921 |
| | | | 428/141 |
| 2009/0190123 A1* | 7/2009 | Hariyama .......... | G01N 21/8922 |
| | | | 356/237.2 |
| 2012/0092790 A1* | 4/2012 | Hellwig ................ | G11B 5/746 |
| | | | 360/110 |
| 2013/0136952 A1 | 5/2013 | Yukimatsu et al. | |
| 2016/0254018 A1* | 9/2016 | Yoshida ................... | G11B 5/84 |
| | | | 428/846.9 |
| 2021/0012801 A1* | 1/2021 | Murata ................... | C23C 18/54 |
| 2022/0358964 A1 | 11/2022 | Matsumoto et al. | |

OTHER PUBLICATIONS

International Search Report and Written Opinion for Application No. PCT/US25/48519, dated Mar. 11, 2026, 9 pages.

* cited by examiner

*Primary Examiner* — Peter Vincent Agustin
(74) *Attorney, Agent, or Firm* — LOZA & LOZA, LLP; Gabriel Fitch

(57) ABSTRACT

A substrate for use in a magnetic recording medium, and methods and apparatus for identifying a substrate suitable for a magnetic medium of a data storage device are described. In an aspect, the substrate includes a surface comprising physical characteristics including composite waviness values determined for multiple locations on the surface, each of the composite waviness values being less than a composite waviness threshold. In an aspect, the composite waviness values are based on first waviness values and second waviness values, the first waviness values being representative of surface waviness of the surface within a first wavelength range, at the multiple locations, respectively, and the second waviness values being representative of surface waviness of the surface within a second wavelength range, at the multiple locations, respectively, the second wavelength range being different from the first wavelength range.

25 Claims, 20 Drawing Sheets

1200

1202

950

| | Locations | Nano-waviness | Micro-waviness | Composite waviness |
|---|---|---|---|---|
| Waviness from 8 locations at R1 | A | 1.042 | 1.212 | 1.599 |
| | B | 0.981 | 1.174 | 1.530 |
| | C | 0.887 | 1.092 | 1.407 |
| | D | 0.821 | 1.071 | 1.349 |
| | E | 0.764 | 0.994 | 1.254 |
| | F | 0.836 | 1.064 | 1.354 |
| | G | 0.780 | 1.020 | 1.284 |
| | H | 0.722 | 0.940 | 1.185 |
| Waviness from 8 locations at R2 | I | 0.958 | 0.821 | 1.261 |
| | J | 0.976 | 0.764 | 1.239 |
| | K | 0.989 | 0.836 | 1.295 |
| | L | 0.988 | 0.780 | 1.259 |
| | M | 1.026 | 0.863 | 1.341 |
| | N | 1.040 | 0.795 | 1.309 |
| | O | 1.012 | 0.815 | 1.299 |
| | P | 1.034 | 0.887 | 1.363 |
| Average | | 0.929 | 0.946 | 1.333 |
| Stdev | | 0.109 | 0.146 | 0.106 |

900

1000

| | Simulated Comp Waviness at A | Simulated Comp Waviness at B | Diff between A value and B value | | Simulated Comp Waviness at A | Simulated Comp Waviness at B | Diff between A value and B value |
|---|---|---|---|---|---|---|---|
| 1 | 1.268929703 | 1.453260721 | 0.184331018 | 51 | 1.352894323 | 1.306452324 | 0.046441999 |
| 2 | 1.259605701 | 1.547350015 | 0.287744313 | 52 | 1.296641326 | 1.258416546 | 0.03822478 |
| 3 | 1.549892433 | 1.50752016 | 0.042372273 | 53 | 1.453514741 | 1.373164834 | 0.080349907 |
| 4 | 1.269977731 | 1.322922402 | 0.052944671 | 54 | 1.28313903 | 1.469390737 | 0.186251707 |
| 5 | 1.394410817 | 1.33639784 | 0.058012977 | 55 | 1.286772574 | 1.347189892 | 0.060417318 |
| 6 | 1.263615033 | 1.272839709 | 0.009224676 | 56 | 1.507411669 | 1.367636177 | 0.139775491 |
| 7 | 1.175998723 | 1.276752648 | 0.100753925 | 57 | 1.361924478 | 1.398980864 | 0.037056386 |
| 8 | 1.440016601 | 1.361680743 | 0.078335858 | 58 | 1.309426243 | 1.412876779 | 0.103450536 |
| 9 | 1.302969337 | 1.352814872 | 0.049845535 | 59 | 1.272661574 | 1.350822815 | 0.078161241 |
| 10 | 1.317502449 | 1.337397191 | 0.019894742 | 60 | 1.314006963 | 1.253723059 | 0.060283904 |
| 11 | 1.432379647 | 1.153258078 | 0.279121568 | 61 | 1.354098778 | 1.252431903 | 0.101666875 |
| 12 | 1.411336999 | 1.244408071 | 0.166928929 | 62 | 1.399648789 | 1.320899258 | 0.078749531 |
| 13 | 1.35511464 | 0.988508739 | 0.3666059 | 63 | 1.287536532 | 1.242962278 | 0.044574254 |
| 14 | 1.430475418 | 1.192274104 | 0.238201314 | 64 | 1.203279329 | 1.431588446 | 0.228309116 |
| 15 | 1.276697821 | 1.218067308 | 0.058630513 | 65 | 1.415633418 | 1.387744278 | 0.02788914 |
| 16 | 1.173222482 | 1.528971831 | 0.355749349 | 66 | 1.300723966 | 1.287707199 | 0.013016766 |
| 17 | 1.316873067 | 1.477369534 | 0.160496468 | 67 | 1.355683924 | 1.087746306 | 0.267937618 |
| 18 | 1.530413405 | 1.357129745 | 0.17328366 | 68 | 1.370013696 | 1.364460968 | 0.005552728 |
| 19 | 1.254237862 | 1.28855018 | 0.034312317 | 69 | 1.432863909 | 1.149835129 | 0.28302878 |
| 20 | 1.101424273 | 1.317157997 | 0.215733724 | 70 | 1.219084888 | 1.485249685 | 0.266164797 |
| 21 | 1.323931076 | 1.343473273 | 0.019542196 | 71 | 1.482319678 | 1.352201158 | 0.13011852 |
| 22 | 1.431689421 | 1.326122758 | 0.105566663 | 72 | 1.290323724 | 1.328273968 | 0.037950244 |
| 23 | 1.345163776 | 1.519719598 | 0.174555822 | 73 | 1.27592593 | 1.220713334 | 0.055212596 |
| 24 | 1.416385626 | 1.348518284 | 0.067867342 | 74 | 1.280339353 | 1.27352903 | 0.006810322 |
| 25 | 1.260505401 | 1.288881453 | 0.028376052 | 75 | 1.311890751 | 1.338561325 | 0.026670574 |
| 26 | 1.194568393 | 1.411976238 | 0.217407845 | 76 | 1.26027577 | 1.418900604 | 0.158624834 |
| 27 | 1.410916344 | 1.402418066 | 0.008498278 | 77 | 1.424415558 | 1.441019189 | 0.016603632 |
| 28 | 1.186713851 | 1.357647416 | 0.170933565 | 78 | 1.192976858 | 1.205811858 | 0.012835 |
| 29 | 1.180725713 | 1.409193353 | 0.228467639 | 79 | 1.529088155 | 1.2918601 | 0.237228055 |
| 30 | 1.377911703 | 1.282294065 | 0.095617638 | 80 | 1.036097706 | 1.280058361 | 0.243960655 |
| 31 | 1.396493186 | 1.334764454 | 0.061728732 | 81 | 1.112644215 | 1.368484423 | 0.255840208 |
| 32 | 1.223004736 | 1.350466823 | 0.127462087 | 82 | 1.375667295 | 1.404749711 | 0.029082416 |
| 33 | 1.284676014 | 1.256528109 | 0.028147905 | 83 | 1.277005595 | 1.3801842 | 0.103178605 |
| 34 | 1.353524016 | 1.297772743 | 0.055751273 | 84 | 1.326570846 | 1.409035868 | 0.082465023 |
| 35 | 1.423209139 | 1.358923844 | 0.064285295 | 85 | 1.350135114 | 1.182501896 | 0.167633218 |
| 36 | 1.181637715 | 1.368580612 | 0.186942897 | 86 | 1.432602578 | 1.257867598 | 0.17473498 |
| 37 | 1.591033449 | 1.379667399 | 0.211366051 | 87 | 1.297743001 | 1.361966748 | 0.064223747 |
| 38 | 1.315762972 | 1.431693067 | 0.115930096 | 88 | 1.292288764 | 1.290772401 | 0.001516364 |
| 39 | 1.499823921 | 1.313607314 | 0.186216607 | 89 | 1.289282598 | 1.396007213 | 0.106724615 |
| 40 | 1.381951427 | 1.334773361 | 0.047178066 | 90 | 1.348656611 | 1.281701421 | 0.06695519 |
| 41 | 1.355009305 | 1.260941418 | 0.094067888 | 91 | 1.545671267 | 1.295169111 | 0.250502156 |
| 42 | 1.181338182 | 1.274684351 | 0.093346169 | 92 | 1.235885414 | 1.461960861 | 0.226075447 |
| 43 | 1.418735938 | 1.525880092 | 0.107144154 | 93 | 1.207210732 | 1.23579041 | 0.028579678 |
| 44 | 1.341057605 | 1.242862928 | 0.098194677 | 94 | 1.275311199 | 1.258007086 | 0.017304114 |
| 45 | 1.319249976 | 1.429144944 | 0.109894968 | 95 | 1.284989716 | 1.42580574 | 0.140816024 |
| 46 | 1.422099016 | 1.138518685 | 0.283580331 | 96 | 1.258531908 | 1.290204578 | 0.03167267 |
| 47 | 1.486492341 | 1.208481983 | 0.278010358 | 97 | 1.563674333 | 1.551965663 | 0.01170867 |
| 48 | 1.219734241 | 1.258696384 | 0.038962143 | 98 | 1.58896569 | 1.368982252 | 0.219983437 |
| 49 | 1.365887618 | 1.23968215 | 0.126205468 | 99 | 1.465439155 | 1.333240753 | 0.132198402 |
| 50 | 1.409766773 | 1.222438234 | 0.187328539 | 100 | 1.210598774 | 1.301282909 | 0.090684136 |

*FIG. 10*

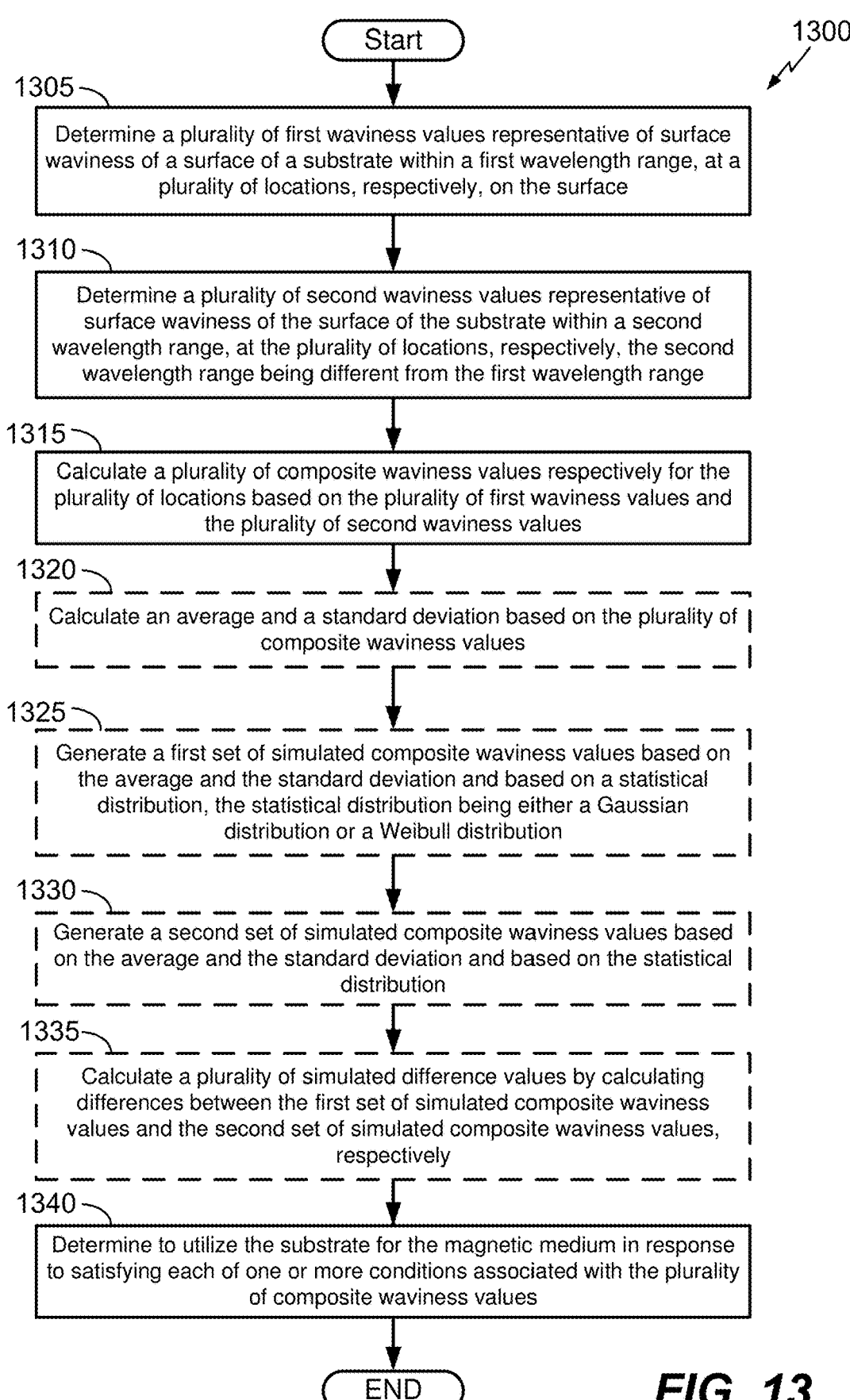

1300

Start

1305
Determine a plurality of first waviness values representative of surface waviness of a surface of a substrate within a first wavelength range, at a plurality of locations, respectively, on the surface 1310
Determine a plurality of second waviness values representative of surface waviness of the surface of the substrate within a second wavelength range, at the plurality of locations, respectively, the second wavelength range being different from the first wavelength range 1315
Calculate a plurality of composite waviness values respectively for the plurality of locations based on the plurality of first waviness values and the plurality of second waviness values 1320
Calculate an average and a standard deviation based on the plurality of composite waviness values 1325
Generate a first set of simulated composite waviness values based on the average and the standard deviation and based on a statistical distribution, the statistical distribution being either a Gaussian distribution or a Weibull distribution 1330
Generate a second set of simulated composite waviness values based on the average and the standard deviation and based on the statistical distribution 1335
Calculate a plurality of simulated difference values by calculating differences between the first set of simulated composite waviness values and the second set of simulated composite waviness values, respectively 1340
Determine to utilize the substrate for the magnetic medium in response to satisfying each of one or more conditions associated with the plurality of composite waviness values

END

*FIG. 13*

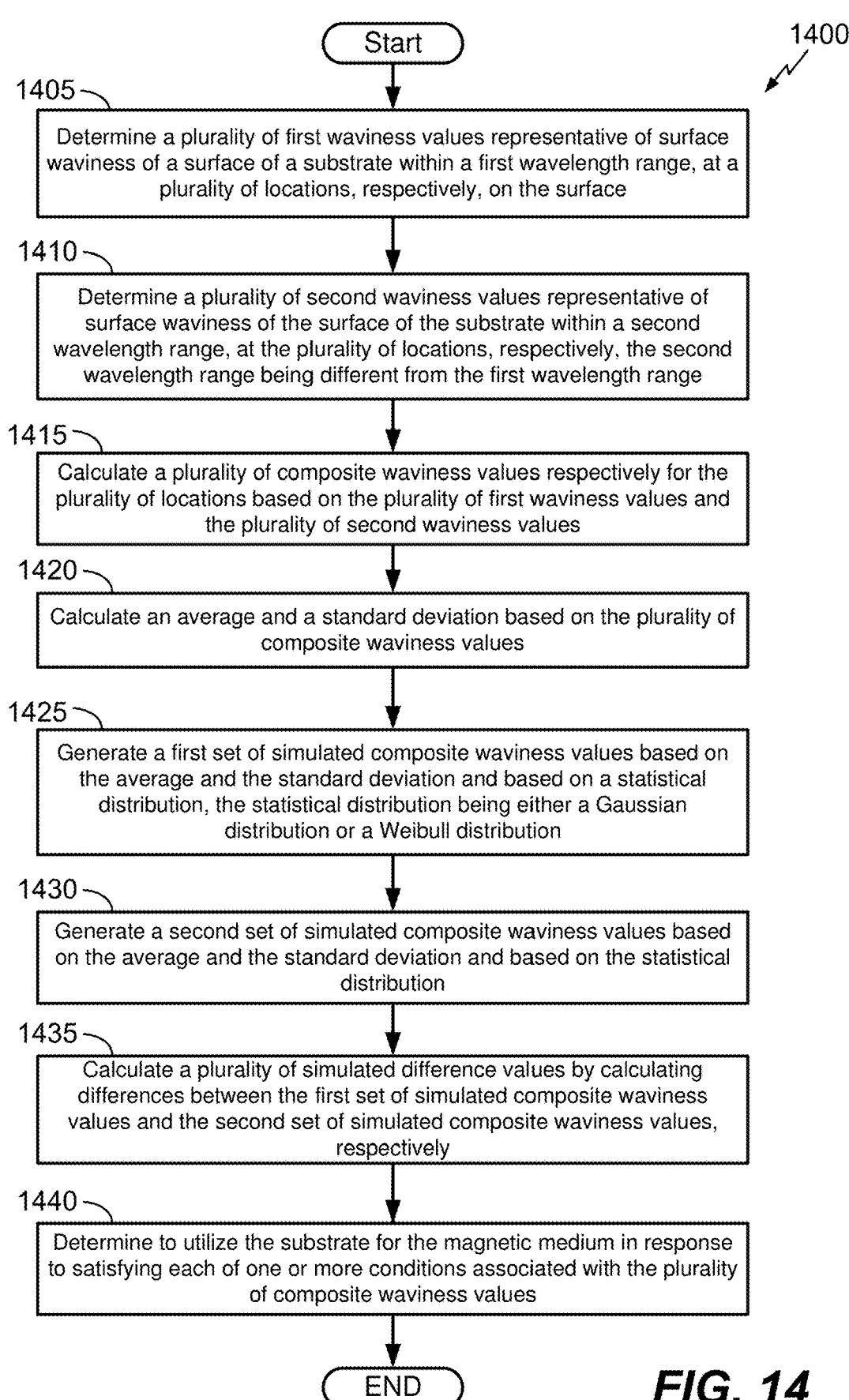

Start

1405 — Determine a plurality of first waviness values representative of surface waviness of a surface of a substrate within a first wavelength range, at a plurality of locations, respectively, on the surface 1410 — Determine a plurality of second waviness values representative of surface waviness of the surface of the substrate within a second wavelength range, at the plurality of locations, respectively, the second wavelength range being different from the first wavelength range 1415 — Calculate a plurality of composite waviness values respectively for the plurality of locations based on the plurality of first waviness values and the plurality of second waviness values 1420 — Calculate an average and a standard deviation based on the plurality of composite waviness values 1425 — Generate a first set of simulated composite waviness values based on the average and the standard deviation and based on a statistical distribution, the statistical distribution being either a Gaussian distribution or a Weibull distribution 1430 — Generate a second set of simulated composite waviness values based on the average and the standard deviation and based on the statistical distribution 1435 — Calculate a plurality of simulated difference values by calculating differences between the first set of simulated composite waviness values and the second set of simulated composite waviness values, respectively 1440 — Determine to utilize the substrate for the magnetic medium in response to satisfying each of one or more conditions associated with the plurality of composite waviness values

END

*FIG. 14*

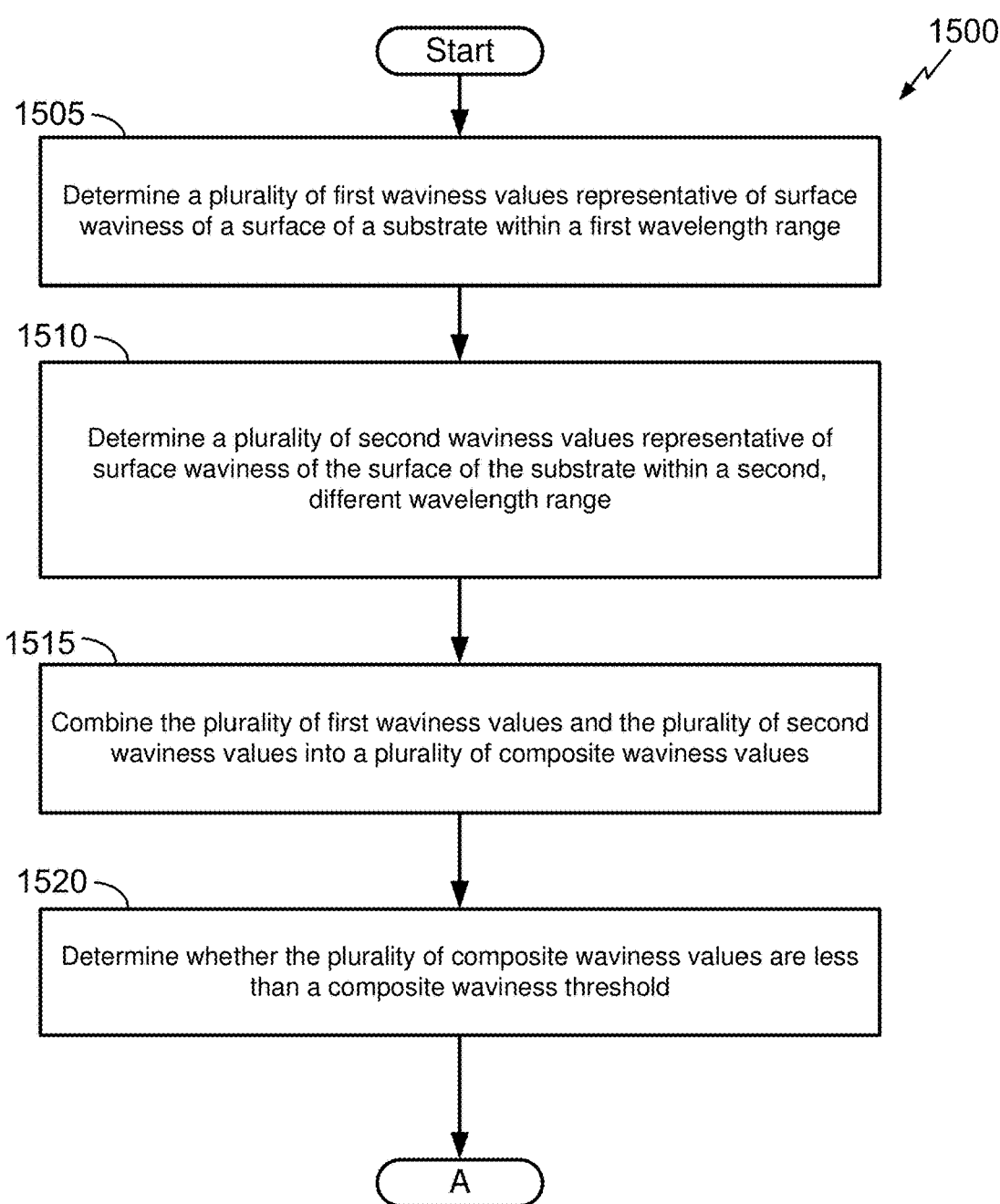

1500

Start

1505

Determine a plurality of first waviness values representative of surface waviness of a surface of a substrate within a first wavelength range

1510

Determine a plurality of second waviness values representative of surface waviness of the surface of the substrate within a second, different wavelength range

1515

Combine the plurality of first waviness values and the plurality of second waviness values into a plurality of composite waviness values

1520

Determine whether the plurality of composite waviness values are less than a composite waviness threshold

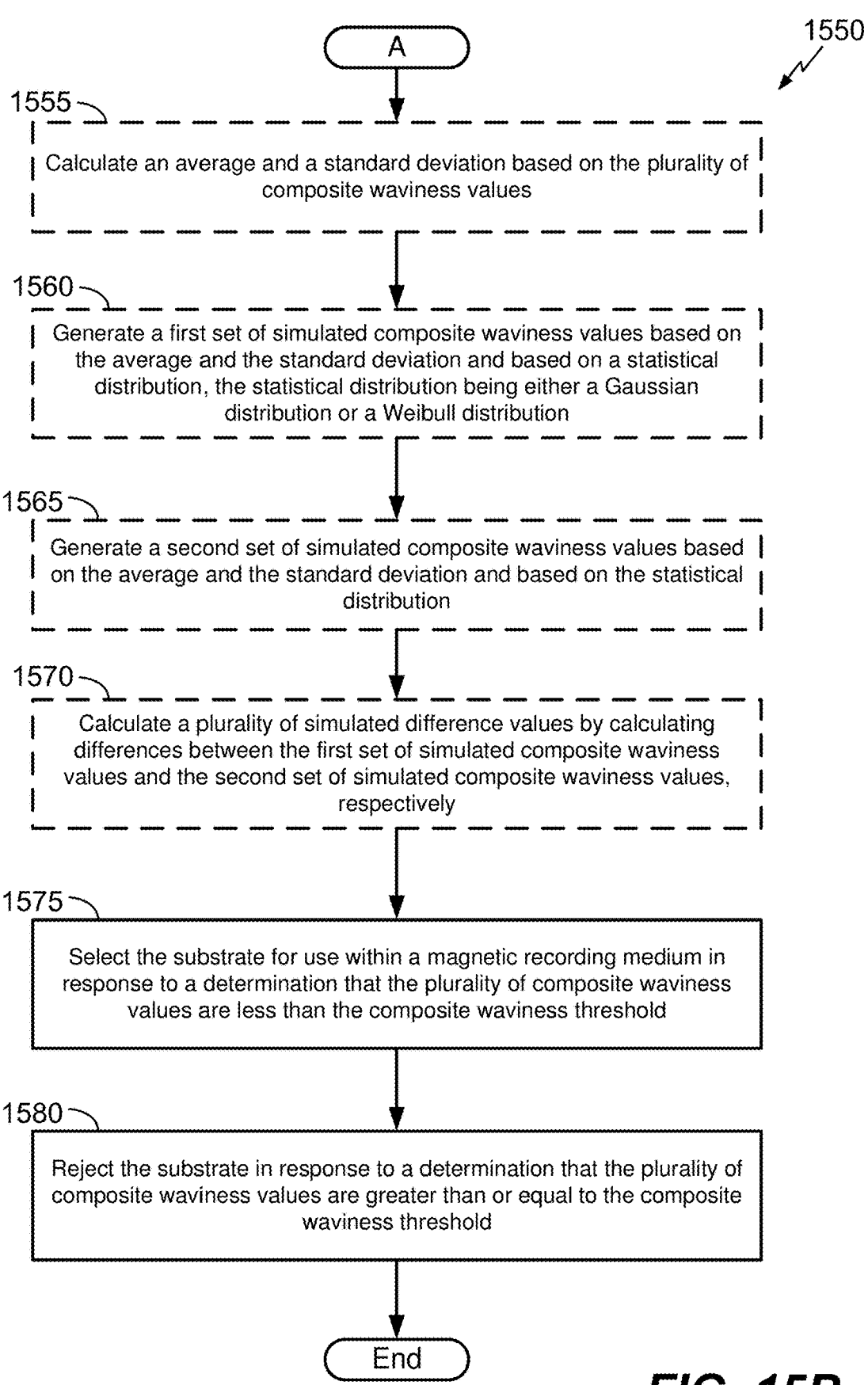

1550

A

1555
Calculate an average and a standard deviation based on the plurality of composite waviness values 1560
Generate a first set of simulated composite waviness values based on the average and the standard deviation and based on a statistical distribution, the statistical distribution being either a Gaussian distribution or a Weibull distribution 1565
Generate a second set of simulated composite waviness values based on the average and the standard deviation and based on the statistical distribution 1570
Calculate a plurality of simulated difference values by calculating differences between the first set of simulated composite waviness values and the second set of simulated composite waviness values, respectively 1575
Select the substrate for use within a magnetic recording medium in response to a determination that the plurality of composite waviness values are less than the composite waviness threshold 1580
Reject the substrate in response to a determination that the plurality of composite waviness values are greater than or equal to the composite waviness threshold End

*FIG. 15B*

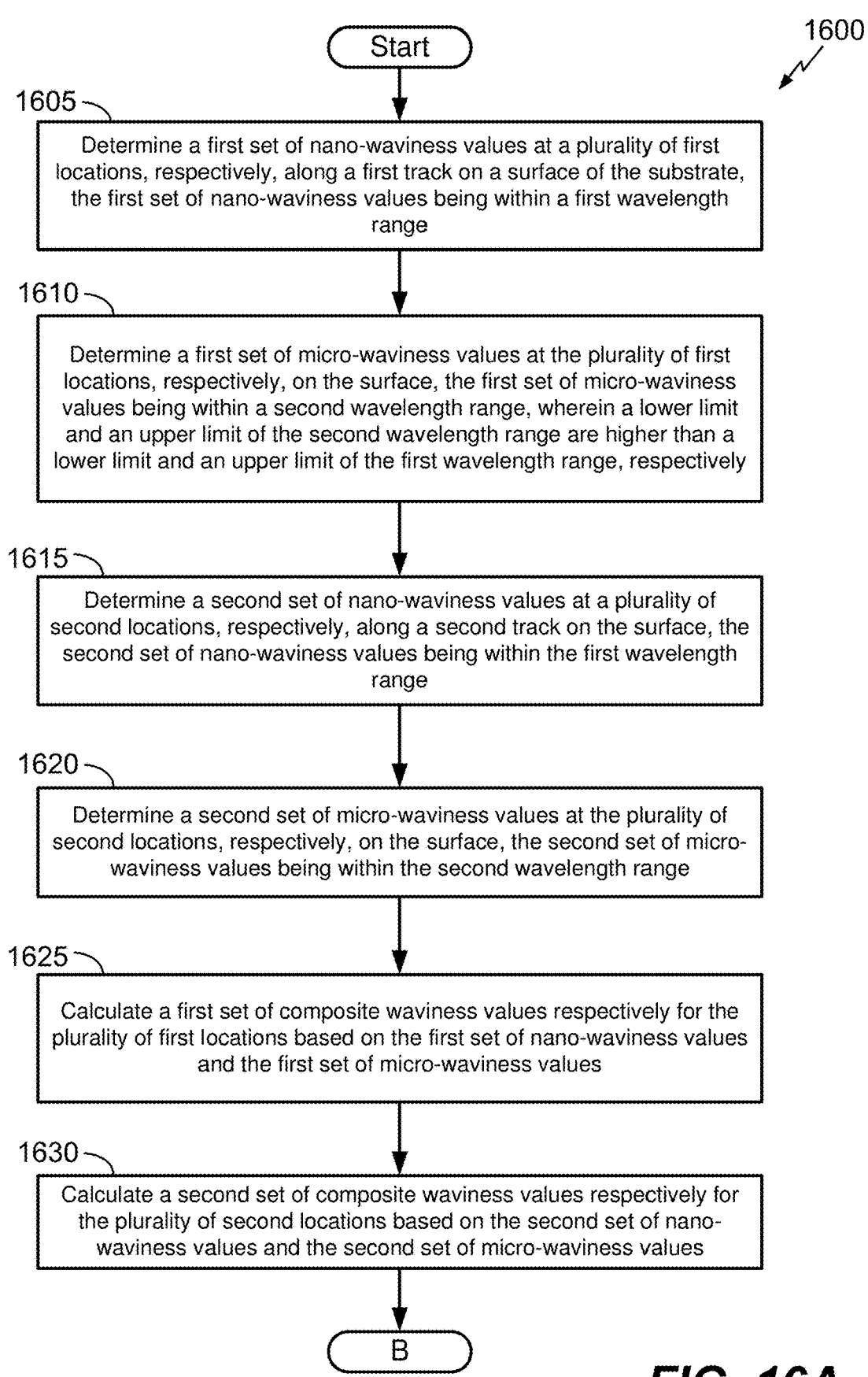

1600

Start

1605 — Determine a first set of nano-waviness values at a plurality of first locations, respectively, along a first track on a surface of the substrate, the first set of nano-waviness values being within a first wavelength range 1610 — Determine a first set of micro-waviness values at the plurality of first locations, respectively, on the surface, the first set of micro-waviness values being within a second wavelength range, wherein a lower limit and an upper limit of the second wavelength range are higher than a lower limit and an upper limit of the first wavelength range, respectively 1615 — Determine a second set of nano-waviness values at a plurality of second locations, respectively, along a second track on the surface, the second set of nano-waviness values being within the first wavelength range 1620 — Determine a second set of micro-waviness values at the plurality of second locations, respectively, on the surface, the second set of micro-waviness values being within the second wavelength range 1625 — Calculate a first set of composite waviness values respectively for the plurality of first locations based on the first set of nano-waviness values and the first set of micro-waviness values 1630 — Calculate a second set of composite waviness values respectively for the plurality of second locations based on the second set of nano-waviness values and the second set of micro-waviness values

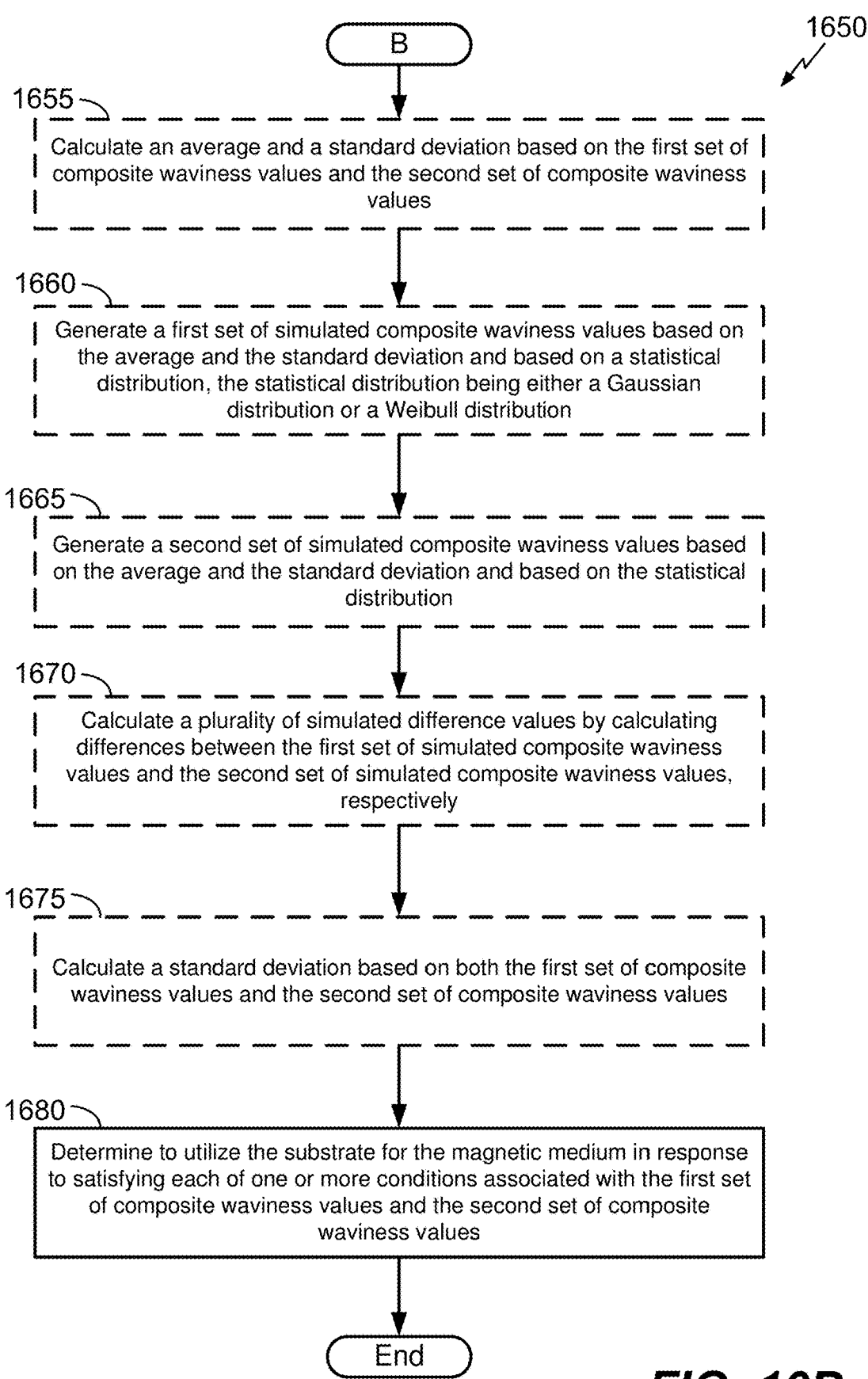

1650

B

1655

Calculate an average and a standard deviation based on the first set of composite waviness values and the second set of composite waviness values

1660

Generate a first set of simulated composite waviness values based on the average and the standard deviation and based on a statistical distribution, the statistical distribution being either a Gaussian distribution or a Weibull distribution

1665

Generate a second set of simulated composite waviness values based on the average and the standard deviation and based on the statistical distribution

1670

Calculate a plurality of simulated difference values by calculating differences between the first set of simulated composite waviness values and the second set of simulated composite waviness values, respectively

1675

Calculate a standard deviation based on both the first set of composite waviness values and the second set of composite waviness values

1680

Determine to utilize the substrate for the magnetic medium in response to satisfying each of one or more conditions associated with the first set of composite waviness values and the second set of composite waviness values End

*FIG. 16B*

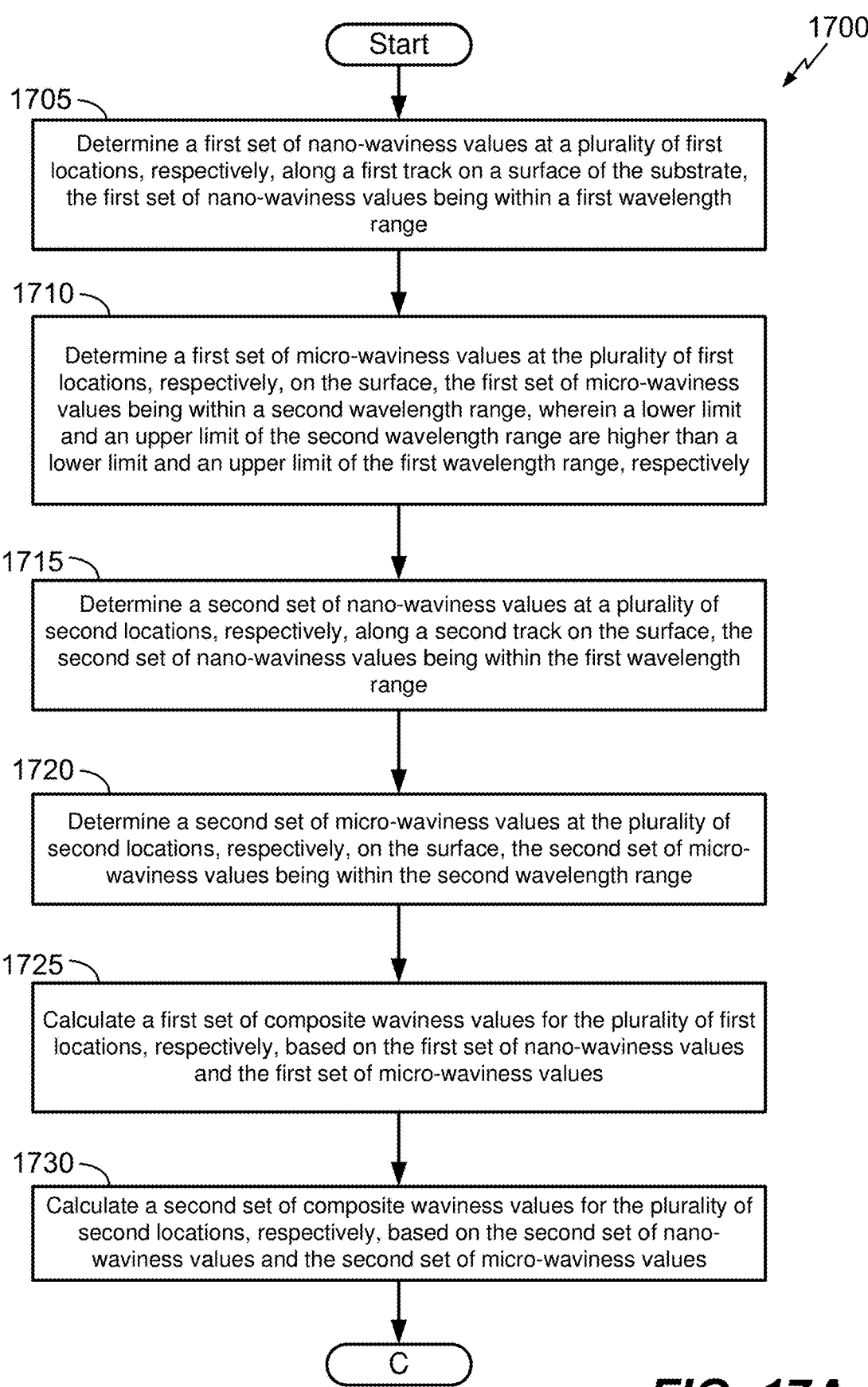

1700

Start

1705 —
Determine a first set of nano-waviness values at a plurality of first locations, respectively, along a first track on a surface of the substrate, the first set of nano-waviness values being within a first wavelength range 1710 —
Determine a first set of micro-waviness values at the plurality of first locations, respectively, on the surface, the first set of micro-waviness values being within a second wavelength range, wherein a lower limit and an upper limit of the second wavelength range are higher than a lower limit and an upper limit of the first wavelength range, respectively 1715 —
Determine a second set of nano-waviness values at a plurality of second locations, respectively, along a second track on the surface, the second set of nano-waviness values being within the first wavelength range 1720 —
Determine a second set of micro-waviness values at the plurality of second locations, respectively, on the surface, the second set of micro-waviness values being within the second wavelength range 1725 —
Calculate a first set of composite waviness values for the plurality of first locations, respectively, based on the first set of nano-waviness values and the first set of micro-waviness values 1730 —
Calculate a second set of composite waviness values for the plurality of second locations, respectively, based on the second set of nano-waviness values and the second set of micro-waviness values

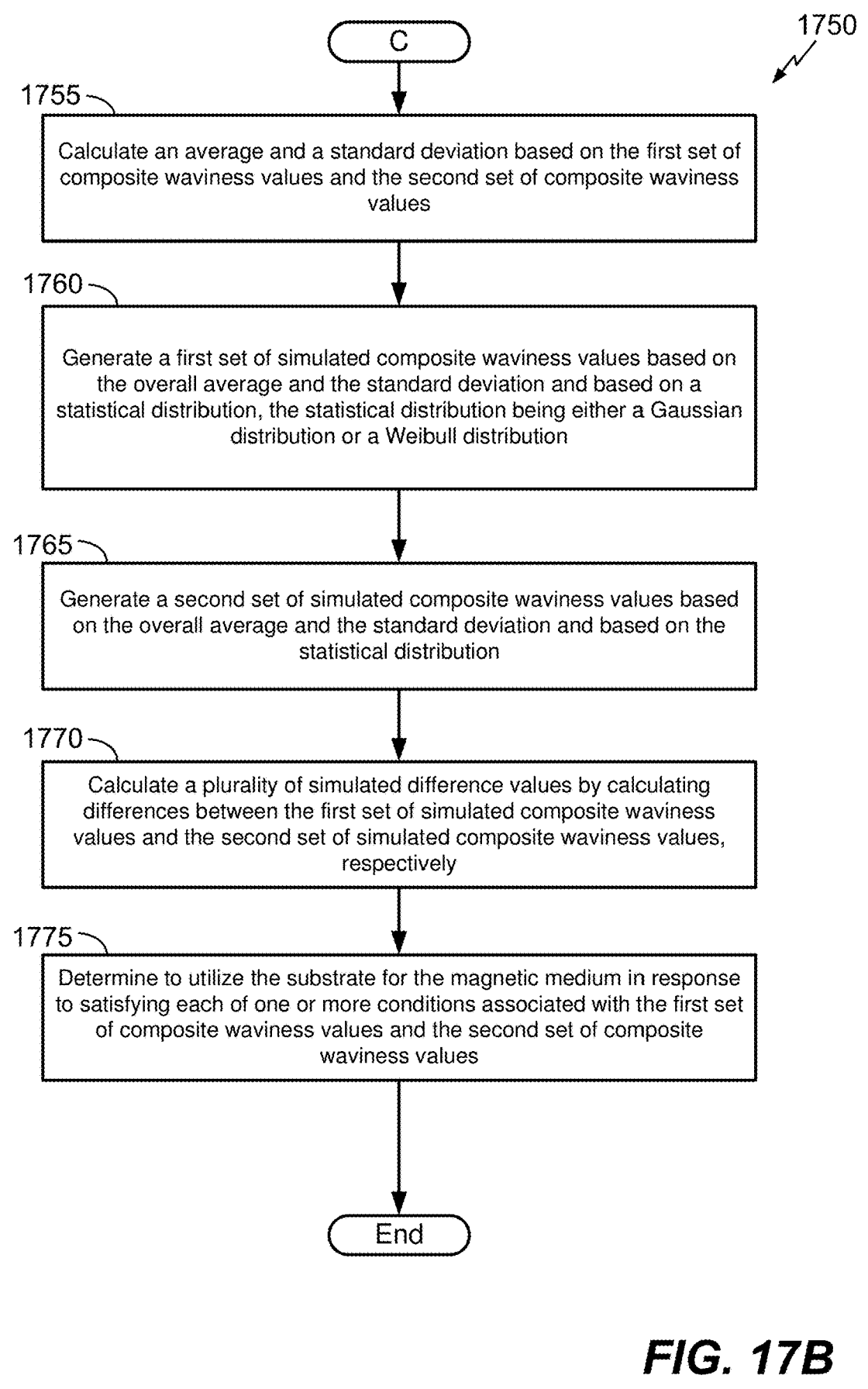

Calculate an average and a standard deviation based on the first set of composite waviness values and the second set of composite waviness values

1760 —

Generate a first set of simulated composite waviness values based on the overall average and the standard deviation and based on a statistical distribution, the statistical distribution being either a Gaussian distribution or a Weibull distribution

1765 —

Generate a second set of simulated composite waviness values based on the overall average and the standard deviation and based on the statistical distribution

1770 —

Calculate a plurality of simulated difference values by calculating differences between the first set of simulated composite waviness values and the second set of simulated composite waviness values, respectively

1775 —

Determine to utilize the substrate for the magnetic medium in response to satisfying each of one or more conditions associated with the first set of composite waviness values and the second set of composite waviness values End

*FIG. 17B*

MAGNETIC RECORDING MEDIA AND METHODS AND APPARATUS FOR IDENTIFYING SUBSTRATES SUITABLE FOR MAGNETIC RECORDING MEDIA

FIELD

The present disclosure relates to substrates for use in magnetic recording media, and more specifically, to substrates that satisfy one or more conditions and methods and apparatus for identifying substrates suitable for a magnetic recording medium of a data storage device configured for magnetic recording.

INTRODUCTION

Magnetic storage systems, such as a hard disk drive (HDD), are utilized in a wide variety of devices in both stationary and mobile computing environments. Examples of devices that incorporate magnetic storage systems include desktop computers, portable notebook computers, portable hard disk drives, digital versatile disc (DVD) players, high-definition television (HDTV) receivers, vehicle control systems, cellular or mobile telephones, television set top boxes, digital cameras, digital video cameras, video game consoles, and portable media players.

A typical disk drive includes magnetic storage/recording media in the form of one or more flat disks or platters. The disks are generally formed of two main substances, namely, a substrate material that gives it structure and rigidity, and a magnetic media coating that holds the magnetic impulses or moments that represent data in a recording layer within the coating. The typical disk drive also includes a read head and a write head, generally in the form of a magnetic transducer which can sense and/or change the magnetic fields stored on the recording layer of the disk. When magnetic storage media uses a non-conductive substrate (such as a glass substrate and/or glass ceramic substrate), a conductive pre-seed layer may be deposited on the non-conductive substrate so that a bias voltage can be applied during the deposition of some or all of the subsequent media films to form the magnetic storage media. In some aspects, during a processing stage of the substrate, a surface of the substrate may not be uniform and thus may not be completely flat, for example, with height variations and/or irregularities. These height variations and/or irregularities may be considered in selecting a substrate suitable for a magnetic medium of a data storage device.

SUMMARY

In one aspect, a substrate for use in a magnetic recording medium is provided. The substrate includes a surface including physical characteristics including a plurality of composite waviness values determined for a plurality of locations on the surface, each of the plurality of composite waviness values being less than a composite waviness threshold, where the plurality of composite waviness values are based on a plurality of first waviness values and a plurality of second waviness values, the plurality of first waviness values being representative of surface waviness of the surface within a first wavelength range, at the plurality of locations, respectively, and the plurality of second waviness values being representative of surface waviness of the surface within a second wavelength range, at the plurality of locations, respectively, the second wavelength range being different from the first wavelength range.

In another aspect, a magnetic recording medium is provided. The magnetic recording medium includes a substrate including a surface including physical characteristics including a plurality of composite waviness values determined for a plurality of locations on the surface, each of the plurality of composite waviness values being less than a composite waviness threshold, where the plurality of composite waviness values are based on a plurality of first waviness values and a plurality of second waviness values, the plurality of first waviness values being representative of surface waviness of the surface within a first wavelength range, at the plurality of locations, respectively, and the plurality of second waviness values being representative of surface waviness of the surface within a second wavelength range, at the plurality of locations, respectively, the second wavelength range being different from the first wavelength range. The magnetic recording medium further includes a magnetic recording layer on the substrate and configured for magnetic recording.

In another aspect, a data storage device is provided. The data storage device includes at least one magnetic head, a magnetic recording medium, a drive mechanism for positioning the at least one magnetic head over the magnetic recording medium, and a controller electrically coupled to the at least one magnetic head for controlling operation of the at least one magnetic head. The magnetic recording medium includes a substrate including a surface including physical characteristics including a plurality of composite waviness values determined for a plurality of locations on the surface, each of the plurality of composite waviness values being less than a composite waviness threshold, where the plurality of composite waviness values are based on a plurality of first waviness values and a plurality of second waviness values, the plurality of first waviness values being representative of surface waviness of the surface within a first wavelength range, at the plurality of locations, respectively, and the plurality of second waviness values being representative of surface waviness of the surface within a second wavelength range, at the plurality of locations, respectively, the second wavelength range being different from the first wavelength range.

In another aspect, a method of identifying a substrate suitable for use within a magnetic medium of a data storage device configured for magnetic recording is provided. The method includes determining a plurality of first waviness values representative of surface waviness of a surface of a substrate within a first wavelength range, at a plurality of locations, respectively, on the surface, determining a plurality of second waviness values representative of surface waviness of the surface of the substrate within a second wavelength range, at the plurality of locations, respectively, the second wavelength range being different from the first wavelength range, and calculating a plurality of composite waviness values respectively for the plurality of locations based on the plurality of first waviness values and the plurality of second waviness values. The method further includes determining to utilize the substrate for the magnetic medium in response to satisfying each of one or more conditions associated with the plurality of composite waviness values, where the one or more conditions includes each of the plurality of composite waviness values being less than a composite waviness threshold.

In another aspect, a method of identifying a substrate suitable for use within a magnetic medium of a data storage device configured for magnetic recording is provided. The method includes determining a plurality of first waviness values representative of surface waviness of a surface of a substrate within a first wavelength range, at a plurality of locations, respectively, on the surface, determining a plurality of second waviness values representative of surface waviness of the surface of the substrate within a second wavelength range, at the plurality of locations, respectively, the second wavelength range being different from the first wavelength range, calculating a plurality of composite waviness values respectively for the plurality of locations based on the plurality of first waviness values and the plurality of second waviness values, and calculating an average and a standard deviation based on the plurality of composite waviness values. The method further includes generating a first set of simulated composite waviness values based on the average and the standard deviation and based on a statistical distribution, the statistical distribution being either a Gaussian distribution or a Weibull distribution, generating a second set of simulated composite waviness values based on the average and the standard deviation and based on the statistical distribution, calculating a plurality of simulated difference values by calculating differences between the first set of simulated composite waviness values and the second set of simulated composite waviness values, respectively. The method also includes determining to utilize the substrate for the magnetic medium in response to satisfying each of one or more conditions associated with the plurality of composite waviness values, where the one or more conditions comprise at least one of: a portion of the plurality of simulated difference values with a value less than a first simulated difference threshold being more than 95% of a number of the plurality of simulated difference values, or a portion of the plurality of simulated difference values with a value less than a second simulated difference threshold being more than 99% of a number of the plurality of simulated difference values.

In another aspect, a method for identifying a substrate suitable for use within a magnetic recording medium is provided. The method includes determining a plurality of first waviness values representative of surface waviness of a surface of a substrate within a first wavelength range, determining a plurality of second waviness values representative of surface waviness of the surface of the substrate within a second, different wavelength range, and combining the plurality of first waviness values and the plurality of second waviness values into a plurality of composite waviness values. The method further includes determining whether the plurality of composite waviness values are less than a composite waviness threshold, selecting the substrate for use within a magnetic recording medium in response to a determination that the plurality of composite waviness values are less than the composite waviness threshold, and rejecting the substrate in response to a determination that the plurality of composite waviness values are greater than or equal to the composite waviness threshold.

In another aspect, a method of identifying a glass substrate suitable for a magnetic medium of a data storage device configured for magnetic recording is provided. The method includes determining a first set of nano-waviness values at a plurality of first locations, respectively, along a first track on a surface of the substrate, the first set of nano-waviness values being within a first wavelength range, and determining a first set of micro-waviness values at the plurality of first locations, respectively, on the surface, the first set of micro-waviness values being within a second wavelength range, wherein a lower limit and an upper limit of the second wavelength range are higher than a lower limit and an upper limit of the first wavelength range, respectively. The method further includes determining a second set of nano-waviness values at a plurality of second locations, respectively, along a second track on the surface, the second set of nano-waviness values being within the first wavelength range, and determining a second set of micro-waviness values at the plurality of second locations, respectively, on the surface, the second set of micro-waviness values being within the second wavelength range. The method further includes calculating a first set of composite waviness values respectively for the plurality of first locations based on the first set of nano-waviness values and the first set of micro-waviness values, and calculating a second set of composite waviness values respectively for the plurality of second locations based on the second set of nano-waviness values and the second set of micro-waviness values. The method also includes determining to utilize the substrate for the magnetic medium in response to satisfying each of one or more conditions associated with the first set of composite waviness values and the second set of composite waviness values, wherein the one or more conditions comprises: each of the first set of composite waviness values and the second set of composite waviness values being less than 1.42 Angstrom.

In another aspect, a method of identifying a glass substrate suitable for a magnetic medium of a data storage device configured for magnetic recording is provided. The method includes determining a first set of nano-waviness values at a plurality of first locations, respectively, along a first track on a surface of the substrate, the first set of nano-waviness values being within a first wavelength range, and determining a first set of micro-waviness values at the plurality of first locations, respectively, on the surface, the first set of micro-waviness values being within a second wavelength range, wherein a lower limit and an upper limit of the second wavelength range are higher than a lower limit and an upper limit of the first wavelength range, respectively. The method further includes determining a second set of nano-waviness values at a plurality of second locations, respectively, along a second track on the surface, the second set of nano-waviness values being within the first wavelength range, and determining a second set of micro-waviness values at the plurality of second locations, respectively, on the surface, the second set of micro-waviness values being within the second wavelength range. The method further includes calculating a first set of composite waviness values respectively for the plurality of first locations based on the first set of nano-waviness values and the first set of micro-waviness values, and calculating a second set of composite waviness values respectively for the plurality of second locations based on the second set of nano-waviness values and the second set of micro-waviness values. The method further includes calculating an average and a standard deviation based on the first set of composite waviness values and the second set of composite waviness values, generating a first set of simulated composite waviness values based on the overall average and the standard deviation and based on a statistical distribution, the statistical distribution being either a Gaussian distribution or a Weibull distribution, generating a second set of simulated composite waviness values based on the overall average and the standard deviation and based on the statistical distribution, calculating a plurality of simulated difference values by calculating differences between the first set of simulated composite waviness values and the second set of simulated composite waviness values, respectively. The method also includes determining to utilize the substrate for the magnetic medium in response to satisfying each of one or more conditions associated with the first set of composite waviness values and the second set of composite waviness values, where the one or more conditions comprise at least one of: a portion of the plurality of simulated difference values with a value less than 0.2 Angstrom being more than 95% of a number of the plurality of simulated difference values, or a portion of the plurality of simulated difference values with a value less than 0.4 Angstrom being more than 99% of a number of the plurality of simulated difference values.

In another aspect, a magnetic storage device is provided. The magnetic storage device includes a plurality of storage disks, a plurality of storage disks, each including a magnetic recording layer for magnetic recording, and at least one magnetic head configured to read from, and write to, the plurality of storage disks, where each of the plurality of storage disks satisfies each of one or more conditions associated with a first set of composite waviness values and a second set of composite waviness values. In an aspect, the first set of composite waviness values for a plurality of first locations, respectively, along a first track on a surface of a respective storage disk are based on a first set of nano-waviness values and a first set of micro-waviness values at the plurality of first locations, respectively, and the second set of composite waviness values for a plurality of second locations, respectively, along a second track on the surface are based on a second set of nano-waviness values and a second set of micro-waviness values at the plurality of second locations, respectively. In an aspect, the first and second sets of nano-waviness values are within a first wavelength range, and the first and second sets of micro-waviness values are within a second wavelength range, a lower limit and an upper limit of the second wavelength range being higher than a lower limit and an upper limit of the first wavelength range, respectively. In an aspect, the one or more conditions comprises: each of the first set of composite waviness values and the second set of composite waviness values being less than 1.42 Angstrom.

In another aspect, an apparatus for identifying a glass substrate suitable for use within a magnetic medium of a data storage device configured for magnetic recording is provided. The apparatus includes means for determining a first set of nano-waviness values respectively at a plurality of first locations along a first track on a surface of the substrate, the first set of nano-waviness values corresponding to a first wavelength range, means for determining a first set of micro-waviness values respectively at the plurality of first locations on the surface, the first set of micro-waviness values corresponding to a second wavelength range, wherein a lower limit and an upper limit of the second wavelength range are higher than a lower limit and an upper limit of the first wavelength range, respectively, means for determining a second set of nano-waviness values respectively at a plurality of second locations along a second track on the surface, the second set of nano-waviness values corresponding to the first wavelength range, and means for determining a second set of micro-waviness values respectively at the plurality of second locations on the surface, the second set of micro-waviness values corresponding to the second wavelength range. The apparatus further includes means for calculating a first set of composite waviness values respectively for the plurality of first locations based on the first set of nano-waviness values and the first set of micro-waviness values, means for calculating a second set of composite waviness values respectively for the plurality of second locations based on the second set of nano-waviness values and the second set of micro-waviness values, and means for determining to utilize the substrate for the magnetic medium in response to satisfying one or more conditions associated with the first set of composite waviness values and the second set of composite waviness values, wherein the one or more conditions comprises: each of the first set of composite waviness values and the second set of composite waviness values being less than 1.42 Angstrom.

BRIEF DESCRIPTION OF THE DRAWINGS

FIG. 10 is an example table showing simulated composite waviness values obtained using a statistical simulation approach, according to some aspects.

FIG. 13 illustrates a method for identifying a glass substrate suitable for a magnetic medium of a data storage device configured for magnetic recording, according to some aspects.

FIG. 14 illustrates a method for identifying a glass substrate suitable for a magnetic medium of a data storage device configured for magnetic recording, according to some aspects.

FIG. 15A illustrates a method for identifying a glass substrate suitable for a magnetic medium of a data storage device configured for magnetic recording, according to some aspects.

FIG. 15B illustrates a method for identifying a glass substrate suitable for a magnetic medium of a data storage device configured for magnetic recording, according to some aspects.

FIG. 16A illustrates a method for identifying a glass substrate suitable for a magnetic medium of a data storage device configured for magnetic recording, according to some aspects.

FIG. 16B illustrates a method for identifying a glass substrate suitable for a magnetic medium of a data storage device configured for magnetic recording, according to some aspects.

FIG. 17A illustrates a method for identifying a glass substrate suitable for a magnetic medium of a data storage device configured for magnetic recording, according to some aspects.

FIG. 17B illustrates a method for identifying a glass substrate suitable for a magnetic medium of a data storage device configured for magnetic recording, according to some aspects.

DETAILED DESCRIPTION

In the following description, specific details are given to provide a thorough understanding of the various aspects of the disclosure. However, it will be understood by one of ordinary skill in the art that the aspects may be practiced without these specific details. For example, circuits may be shown in block diagrams in order to avoid obscuring the aspects in unnecessary detail. In other instances, well-known circuits, structures and techniques may not be shown in detail in order not to obscure the aspects of the disclosure.

As discussed above, certain height variations and/or irregularities on the surface of substrates (e.g., glass substrates) may cause problems when such substrates are fabricated as magnetic media for a data storage device. Such variations may cause fluctuations in shape on a surface of a substrate, which may be called waviness. Waviness values within certain wavelength ranges may be examined the surface to determine whether the substrate is acceptable. Instead of examining the entire surface, waviness values in a limited portion of the surface may be sufficient to determine whether the substrate is acceptable. In an aspect, nano-waviness values within a first wavelength range and micro-waviness values within a second wavelength range may be taken along two tracks on the surface, and composite waviness values may be calculated based on the nano-waviness values and micro-waviness values. If one or more conditions associated with the composite waviness values are satisfied, the substrate is suitable for use within a magnetic medium of a data storage device configured for magnetic recording. Note that the wavelengths associated with the waviness are not optical (or electromagnetic) wavelengths. They are wavelengths associated with physical variations or fluctuations in the surface of the substrate.

Figure 1A:
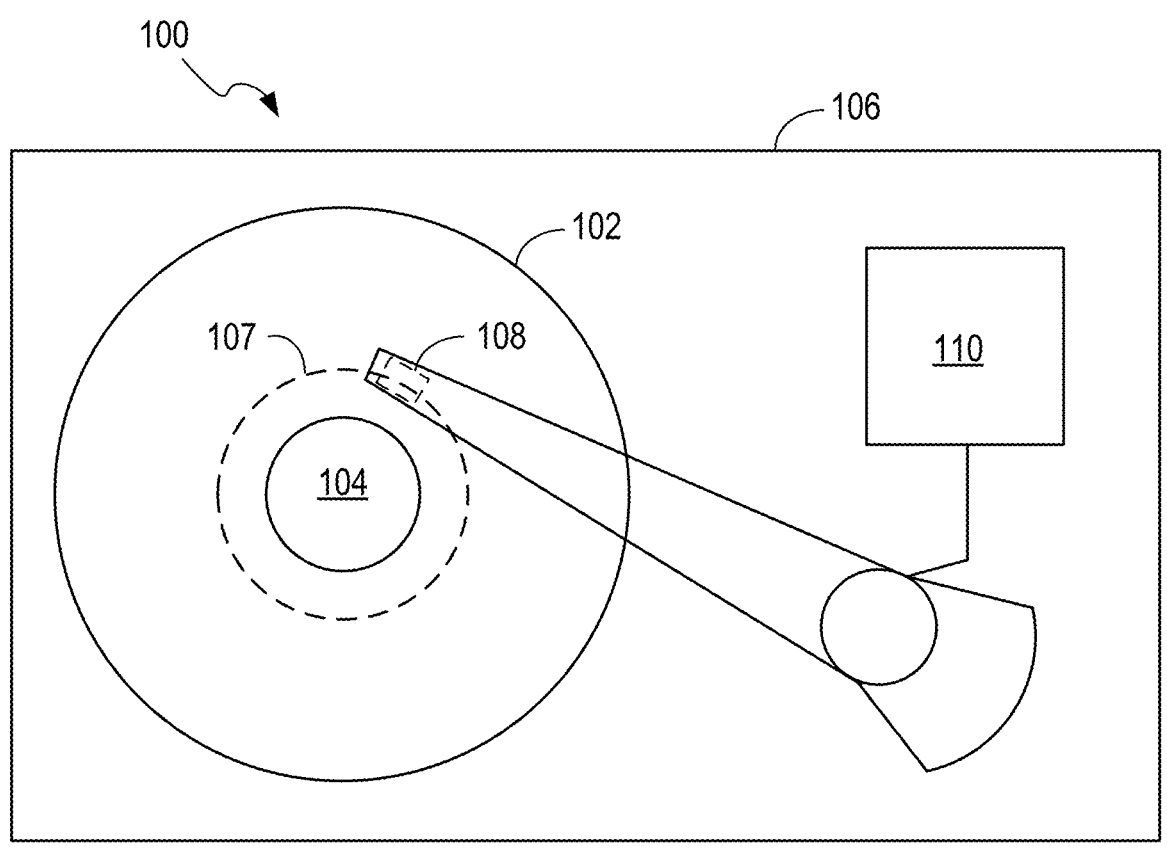
FIG. 1A illustrates a top plan view of a data storage device including a disk shaped magnetic recording medium (magnetic recording disk) in accordance with some aspects.

FIG. 1A is a top schematic view of a data storage device 100 configured for magnetic recording and including a disk shaped magnetic recording medium 102 in accordance with some aspects of the disclosure. In illustrative examples, the magnetic recording medium 102 is configured for perpendicular magnetic recording (PMR). However, other recording media, such as media configured for heat assisted magnetic recording (HAMR) or microwave assisted magnetic recording (MAMR) may be used in other examples. The magnetic storage device 100 may include one or more disks/media 102 to store data. Disk/media 102 resides on a spindle assembly 104 that is mounted to drive housing 106. Data may be stored along tracks 107 along the magnetic recording layer of disk 102. The reading and writing of data are accomplished with the head/slider 108 that may have both read and write elements. The write element is used to alter the properties of the magnetic recording layer of disk 102 and thereby write information thereto. In one embodiment, recording head 108 may have magneto-resistive (MR), or giant magneto-resistive (GMR) elements, such as tunnel magneto-resistive (TMR) elements for reading, and a write pole with coils that can be energized for writing. In another embodiment, head 108 may be another type of head, for example, an inductive read/write head or a Hall effect head. In operation, a spindle motor (not shown) rotates the spindle assembly 104, and thereby rotates disk 102 to position head 108 at a particular location along a desired disk track 107. The position of the head 108 relative to the disk 102 may be controlled by position control circuitry 110.

Figure 1B:
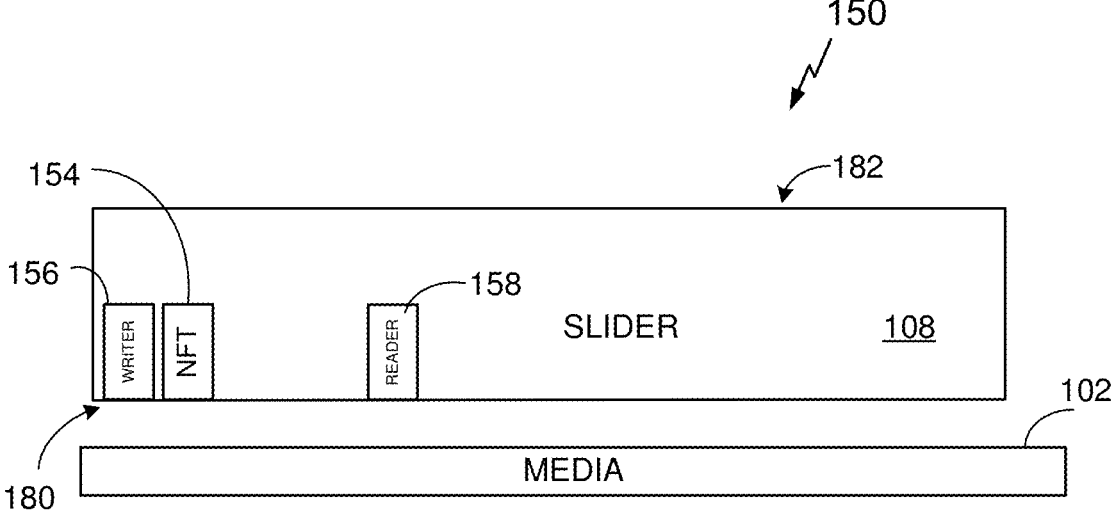
FIG. 1B illustrates a profile view of a slider and the magnetic recording medium of FIG. 1A in accordance with some aspects.

FIG. 1B illustrates a profile view of the slider 108 and the magnetic recording medium 102 of FIG. 1A in accordance with some aspects of the disclosure. In particular, FIG. 1B illustrates an assembly 150 that includes the slider 108, a near-field transducer (NFT) 154 (if the head is configured for heat assisted magnetic recording (HAMR)), a writer 156 and a reader 158. It is noted that FIG. 1B is not drawn to scale and generally the slider 108 is substantially smaller than the media 102 (e.g., as shown in FIG. 1A). The NFT 154 may be omitted in a non-HAMR slider, and other components may be used instead in other types of energy assisted recording technology (e.g., a spin torque oscillator (STO) in a microwave assisted magnetic recording (MAMR) head). The assembly 150 may further include a laser (not shown) configured to direct light energy to the NFT 154 during a writing process, wherein the NFT may generate localized heat energy, in response to the light energy, to assist the writing process. The laser may be mounted to, or made integral with, the slider 108. If the slider 108 is not configured for HAMR (e.g., is configured for non-HAMR applications), the laser and NFT may be omitted. The assembly 150 is positioned over the media 102. The slider 108 may be one component or several components. The slider 108 may include a slider body and a slider head. In some implementations, a slider head may be a separate component that may be integrated with the slider 108. The NFT 154, the writer 156 and the reader 158 may be implemented in the slider, the slider head or combinations thereof.

The slider 108 includes a first surface 180 (e.g., bottom surface) that faces the media 102. The first surface 180 may be referred to as an air bearing surface (ABS). The slider 108 also includes a second surface 182 (e.g., top surface) that faces away from the media 102. The NFT 154, the writer 156 and the reader 158 may be located near or along the first surface 180 of the slider 108. The writer 156 may be a writing element (e.g., means for writing data) for writing data on the media 102, and the reader 158 may be a reading element (e.g., means for reading data) for reading data on the media 102. The writer 156 may include a write pole.

Figure 2:
FIG. 2 illustrates an example fabrication process of glass substrate disks from a glass sheet that are configured to be further processed to form magnetic recording disks in accordance with some aspects.
Figure 2:
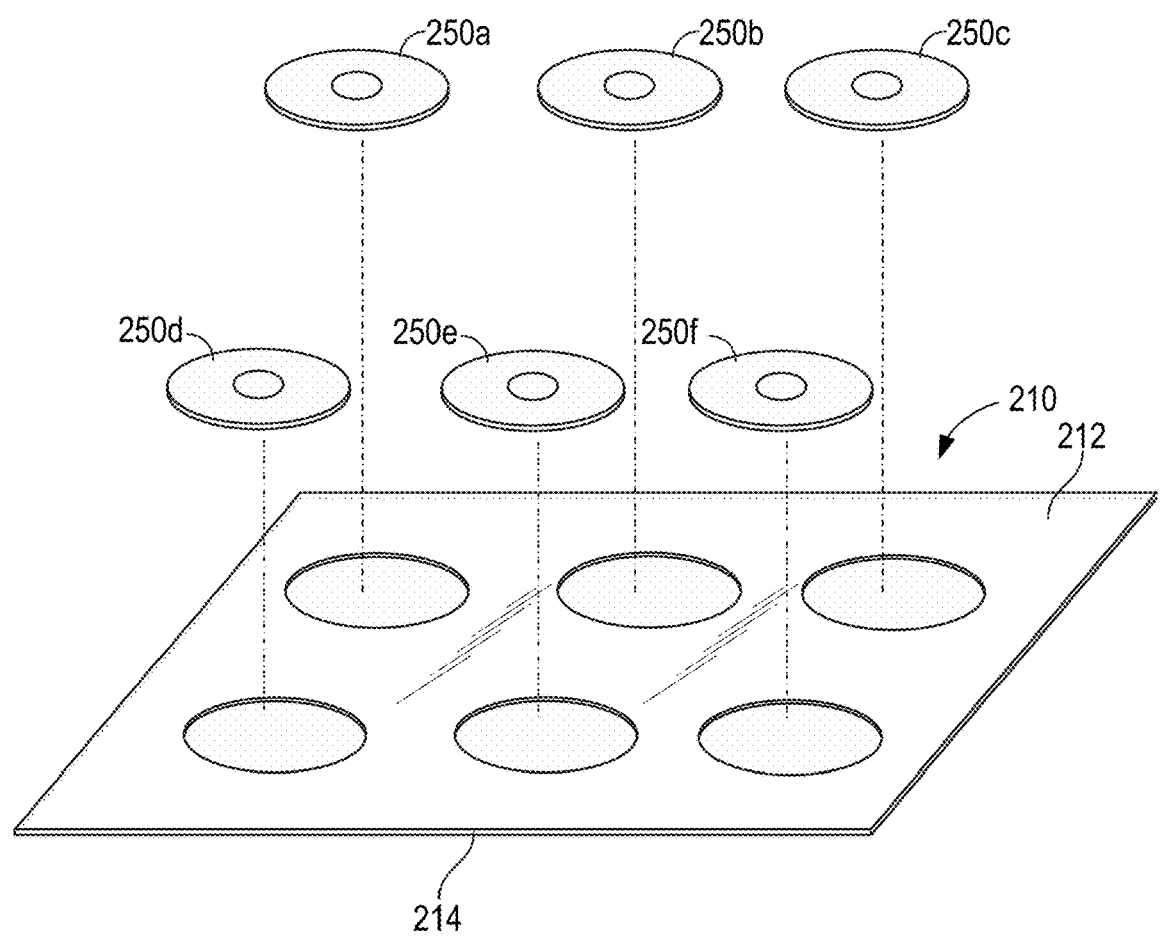

FIG. 2 illustrates an example fabrication process of glass substrate disks from a glass sheet that are configured to be further processed to form magnetic recording disks in accordance with some aspects. To manufacture a magnetic recording disk such as the disk 102 of FIG. 1A, a glass sheet may be cut into multiple glass substrate disks, and the glass substrate disks may be further processed to form magnetic recording disks (e.g., using one or more deposition processes wherein at least one magnetic recording layer is added). As shown in FIG. 2, for example, a glass sheet 210 with a first surface 212 and a second surface 214 are cut into glass substrate disks 230a, 230b, 230c, 230d, 230e, and 230f, which are then processed to form magnetic recording disks (e.g., after undergoing further cutting and various deposition steps). In some examples, the glass sheet may be divided into multiple regions from which multiple glass substrate disks for magnetic recording disks are cut. In the example illustrated in FIG. 2, the glass sheet 210 is divided into six regions, and the glass substrates 230a, 230b, 230c, 230d, 230e, and 230f are cut from the six regions, respectively. In other examples, the glass sheet may be divided into less than or greater than six regions depending on the size of the glass substrates desired and the size of the glass sheet.

A glass sheet is generally an unfinished sheet of glass that may have foreign substances, defects, and/or roughness. Glass substrate disks for the magnetic recording disks generally require a smooth surface with few or no defects. Therefore, after cutting the glass sheet into glass substrate disks, multiple polishing steps and/or a lapping process may be applied to each glass substrate disk to achieve the desired smoothness in the surface and/or to adjust a thickness of the glass substrate.

Figures 3A, 3B:
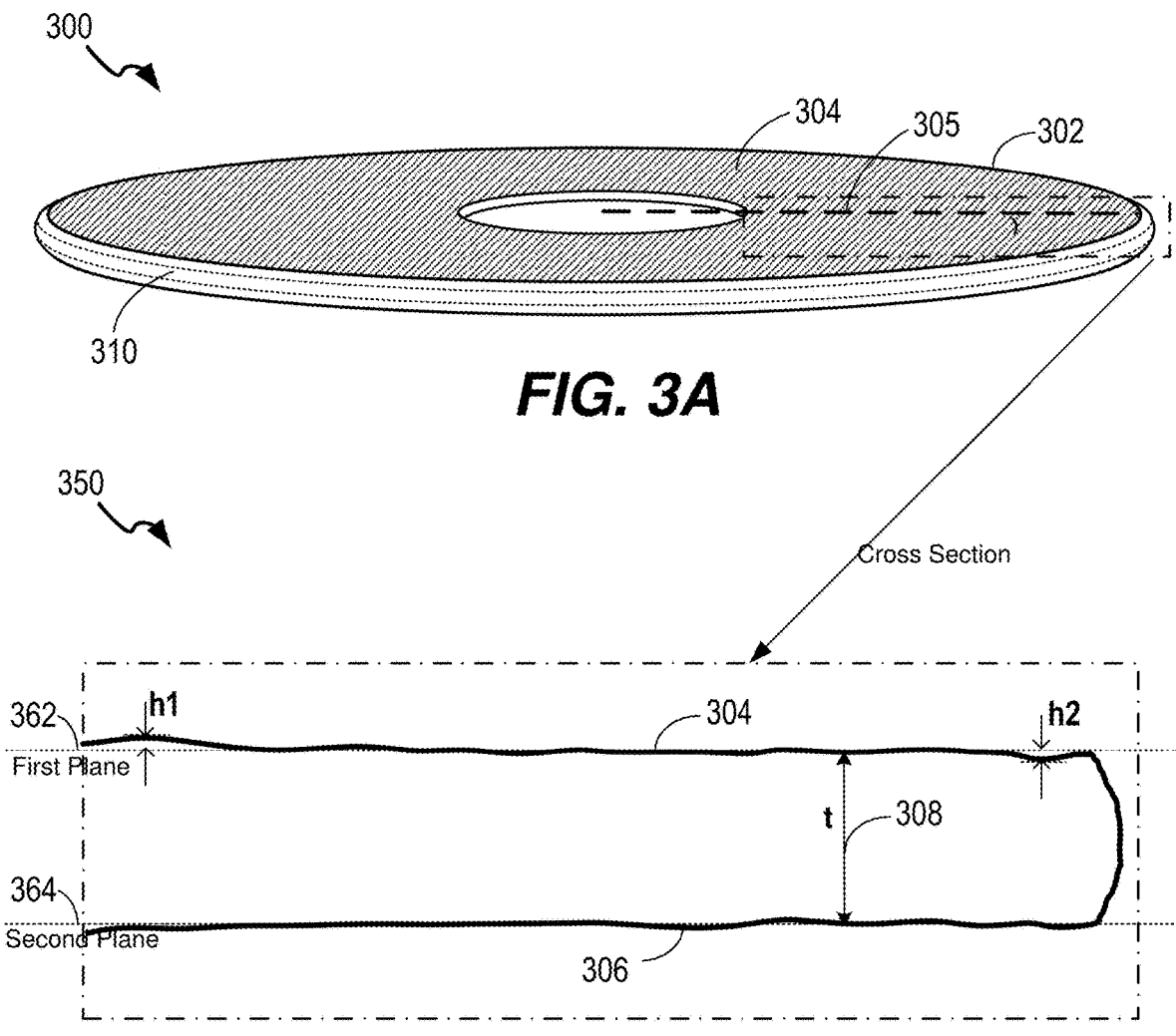
FIG. 3A illustrates an example substrate disk for magnetic recording, according to some aspects.
FIG. 3B illustrates an example expanded view of a cross section of a portion near an OD edge of the substrate disk of FIG. 3A.

FIGS. 3A and 3B illustrate example diagrams showing a substrate disk and a cross section of a portion of the substrate disk, according to some aspects. FIG. 3A illustrates an exemplary diagram 300 showing a substrate disk 302 for magnetic recording. FIG. 3B illustrates an example view 350 of a cross section of a portion of the substrate disk 302. The cross section shown in FIG. 3 may be taken along a plane perpendicular to a first surface 304 and along a radial line 305 of the substrate disk 302. The substrate disk 302, which may be configured for magnetic recording, may have the first surface 304 extending along a first plane 362 and a second surface 306 extending along a second plane 364 parallel to the first plane 362. The first surface 304 may become a data surface after the substrate is fabricated to form a magnetic recording disk, where data may be magnetically recorded in a magnetic recording layer of the magnetic recording disk (e.g., once it has been deposited) on the data surface. For example, the data may be recorded in the magnetic recording layer of the magnetic recording disk using a recording head (e.g., recording head 108). A disk thickness (t) 308 is the thickness between the first surface 304 and the second surface 306, and may be measured along a direction substantially normal to the first plane 362 or the second plane 364. In some aspects, the disk thickness may be less than or equal to 0.5 mm. The substrate disk 302 may further have an outer diameter (OD) edge along a perimeter edge of the substrate disk 302. An OD edge region is a region at or around an OD edge and includes the outer end of the surface of a substrate disk.

As shown in FIG. 3B, the first surface 304 of the substrate disk 302 is generally not completely smooth but rather fluctuates in shape, which may be called waviness. Hence, heights on the first surface 304 vary depending on a location on the first surface 304. A height for a particular point the first surface 304 may be measured by measuring a perpendicular distance from the first plane 362 to the particular point on the first surface 304. For example, for portion of the first surface 304 that corresponds to the cross section shown in FIG. 3B, the first height h1 shows the highest point on this portion of the first surface 304 and the second height h2 shows the lowest point on this portion of the first surface 304.

Figure 4:
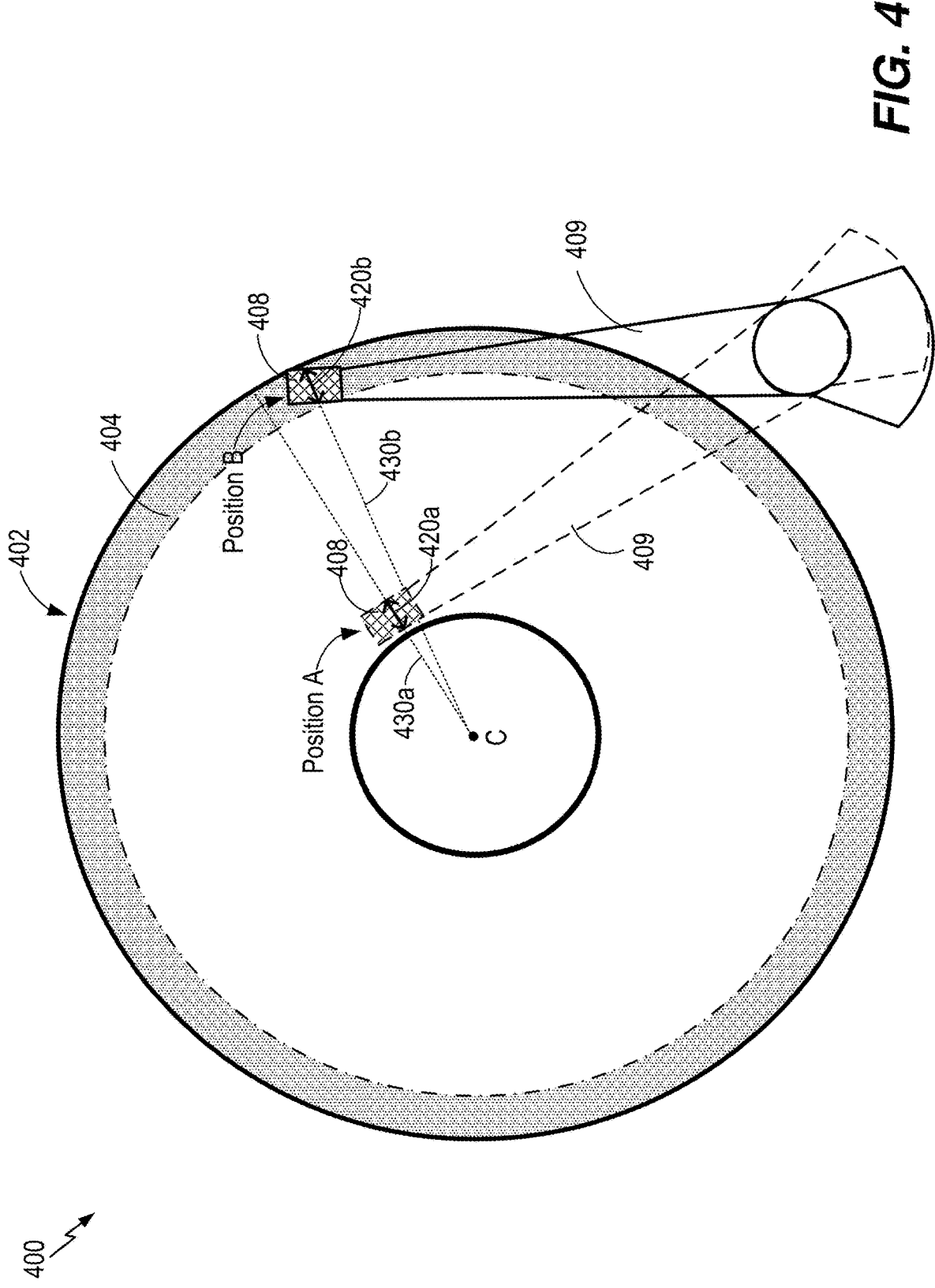
FIG. 4 is an example top plan view of a magnetic recording disk and head assembly and a slider at different portions of the magnetic recording disk, according to some aspects.

FIG. 4 illustrates a top plan view 400 of a magnetic recording disk and head assembly and a slider positioned at different portions of a disk substrate, according to some aspects. FIG. 4 shows a top view of a magnetic recording disk 402 and a slider 408 positioned at the end of a suspension 409 and above the magnetic recording disk 402 at multiple positions. Here, the center (C) is the center of the circle defined by the circularly shaped magnetic recording disk 402. As shown in FIG. 4, the magnetic recording disk 402 has an OD region 404 near an OD of the magnetic recording disk 402. The magnetic recording disk 402 also has an inner diameter (ID) region near an inner diameter of the disk substrate. When the slider 408 is at Position A in the ID region, the slider 408 reads data from the data surface along an ID track 452. When the slider 408 is at Position B in the OD region, the slider 408 reads data from the data surface along an OD track 462. The reading of the data along a track on the data surface may be affected by irregularities or waviness of the data surface, which is discussed more in detail below.

As shown in FIG. 4, when the slider 408 is at Position A near an inner diameter (ID) of the magnetic recording disk 402, a measurement line 420a that is on a straight radial line 430a toward the center (C) of the magnetic recording disk 402 (e.g., a line or length across the slider body which is normal to the circular tracks extending along the disk, where this line/length will be parallel with a radial line of the substrate) is parallel or substantially parallel to a width of the slider 408 and has the same or substantially the same linear length as the width of the slider 408. Here, the center (C) is the center of the circle defined by the circularly shaped magnetic recording disk 402. On the other hand, when the slider 408 is at the OD edge region 404 (e.g., near the OD), a measurement line 420b (e.g., that is on a straight radial line 430b toward the center (C) of the magnetic recording disk 402) is at an angle from a line in the width direction of the slider 408.

Waviness on a surface of a substrate indicates fluctuations in shape on the surface and may represent variations in the minimum fly height values. Waviness components on a substrate affect the flying characteristics such as air-bearing vibrations, spacing variations at the R/W element, and touch-down powers. The waviness components may be affected by polishing steps during substrate manufacturing processes. For example, the polishing steps may include a first polishing step and a second (or final) polishing step. The first polishing step is performed with large slurry particles, while the second polishing step is performed with fine colloidal silica slurry to make the substrate surface smooth. Because these polishing steps are different, the surface requirements may be specified based on the polishing steps. For example, longer wavelengths may be more affected by the first polishing step than the second polishing step and shorter wavelengths may be more affected by the second polishing step than the first polishing step. After the first and second polishing steps, waviness values in a first wavelength range and waviness values in a second wavelength range may be examined for a substrate surface, where a lower limit and an upper limit of the second wavelength range are higher than a lower limit and an upper limit of the first wavelength range, respectively. Waviness values are typically uniform in any direction on a surface, and thus waviness values may be measured in a track direction (e.g., tangential direction along a data track), or in a radial direction, or in both the track direction and the radial direction to measure two dimensional waviness values.

a slider head flying over the surface. In particular, the composite waviness is defined as the following equation.

$$\text{Composite Waviness} = \sqrt{(\text{Waviness } A)^2 + (\text{Waviness } B)^2} \qquad \text{Equation [1]}$$

$$= \sqrt{(NanoWaviness)^2 + (MircoWaviness)^2}$$

Figure 5:
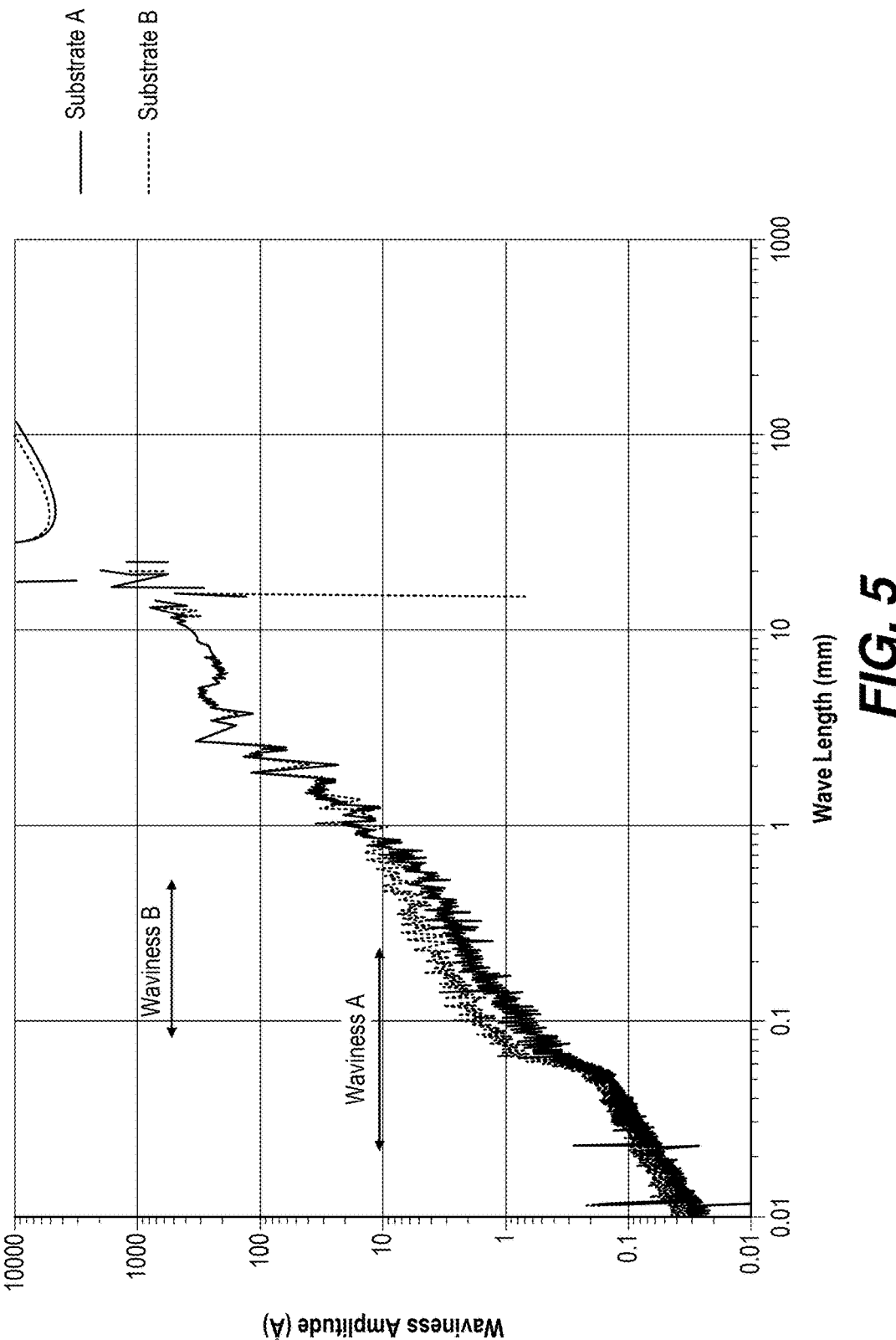
FIG. 5 is an example plot of waviness amplitudes over wavelength of the waviness amplitudes for two substrates with different waviness conditions, according to some aspects.

FIG. 5 is an example plot 500 of waviness amplitudes over wavelength of the waviness amplitudes for two substrates with different waviness conditions, according to some aspects. For example, waviness amplitudes may be measured over various locations and then Fourier transform may be applied to obtain the waviness amplitudes with respect to wavelengths. Waviness A amplitudes within the first wavelength range is mainly determined after the first polishing step and the second polishing step. Waviness B amplitudes within the second wavelength range is determined after the first polishing step. Here, the Waviness A values may be referred to as nano-waviness values and the Waviness B values may be referred to as micro-waviness values. In some aspects, the wavelengths for nano-waviness are in a range between 20 micrometers and 250 micrometers, inclusive, and the wavelengths for the micro-waviness are in a range between 80 micrometers and 500 micrometers, inclusive.

Figure 6:
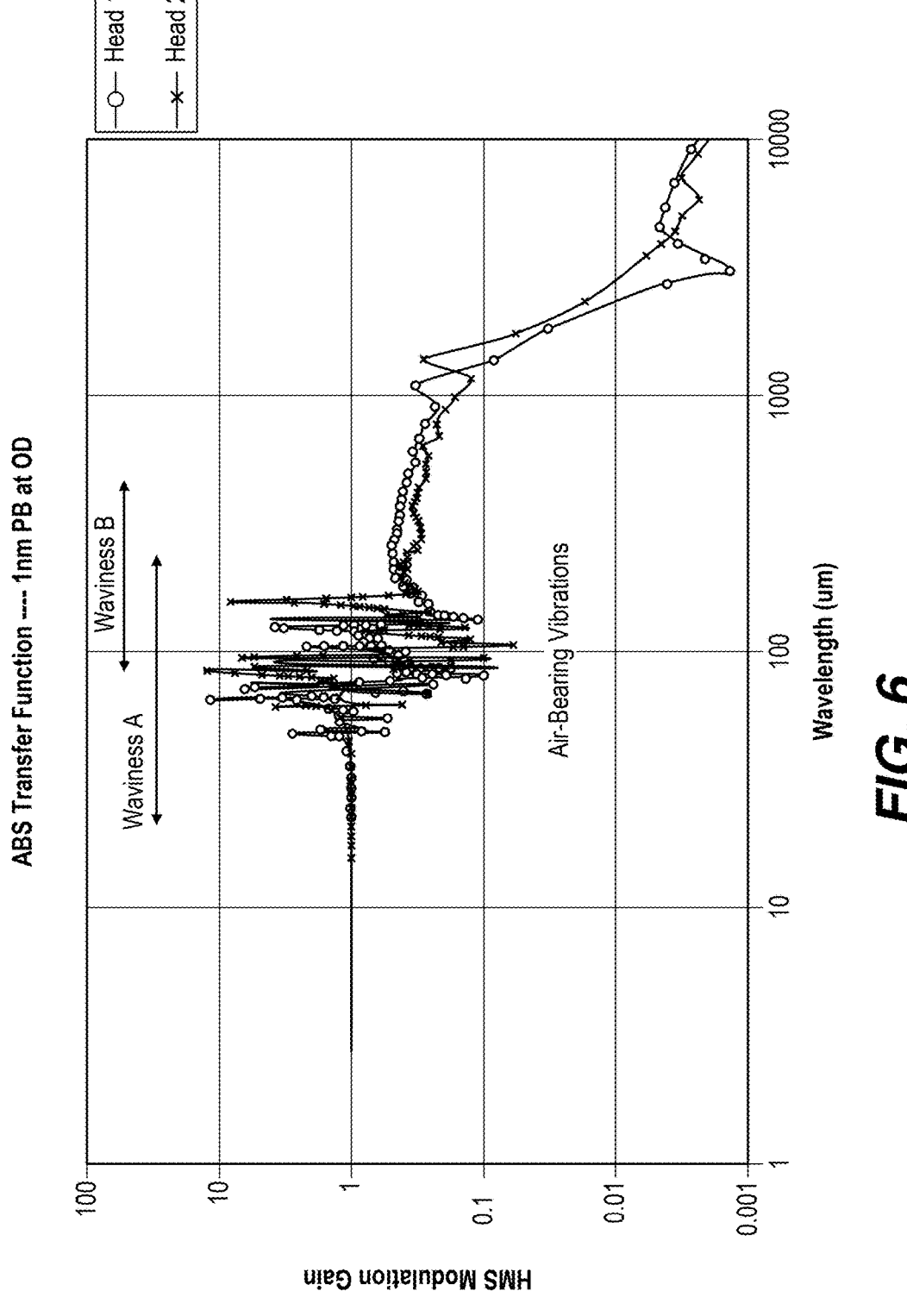
FIG. 6 is an example plot showing transfer function gains of two kinds of slider head over wavelength of waviness amplitudes, according to some aspects.

FIG. 6 is an example plot 600 showing transfer function gains of two kinds of slider head over wavelength of waviness amplitudes, according to some aspects. The Y-axis represents the ratio between the waviness amplitude and fly height modulation and the X-axis represents the wavelengths associated with the waviness. As shown in FIG. 6, high variations in the transfer function gains are observed around the wavelength of 50-500 micrometers due to the resonance vibrations coupled between disk waviness and air-bearings. This wavelength range is covered by both the first wavelength range for Waviness A and the second wavelength range for Waviness B. Hence, Waviness A values (e.g., nano-waviness values) and Waviness B values (e.g., micro-waviness values) can be both considered in characterizing whether a substrate is acceptable or not. Waviness A is mainly for air bearing vibrations and Waviness B is also coupled to the fly height spacing when the slider head's capability to follow a track on a surface is limited due to the waviness. For example, a slider head is usually around 0.7 mm long and thus can follow waviness whose wavelength is longer than the length of the slider head, especially the wavelength greater than 1 mm. Hence, as shown in FIG. 6, there is not much fluctuation for the wavelength greater than 700 micrometers.

Figure 7:
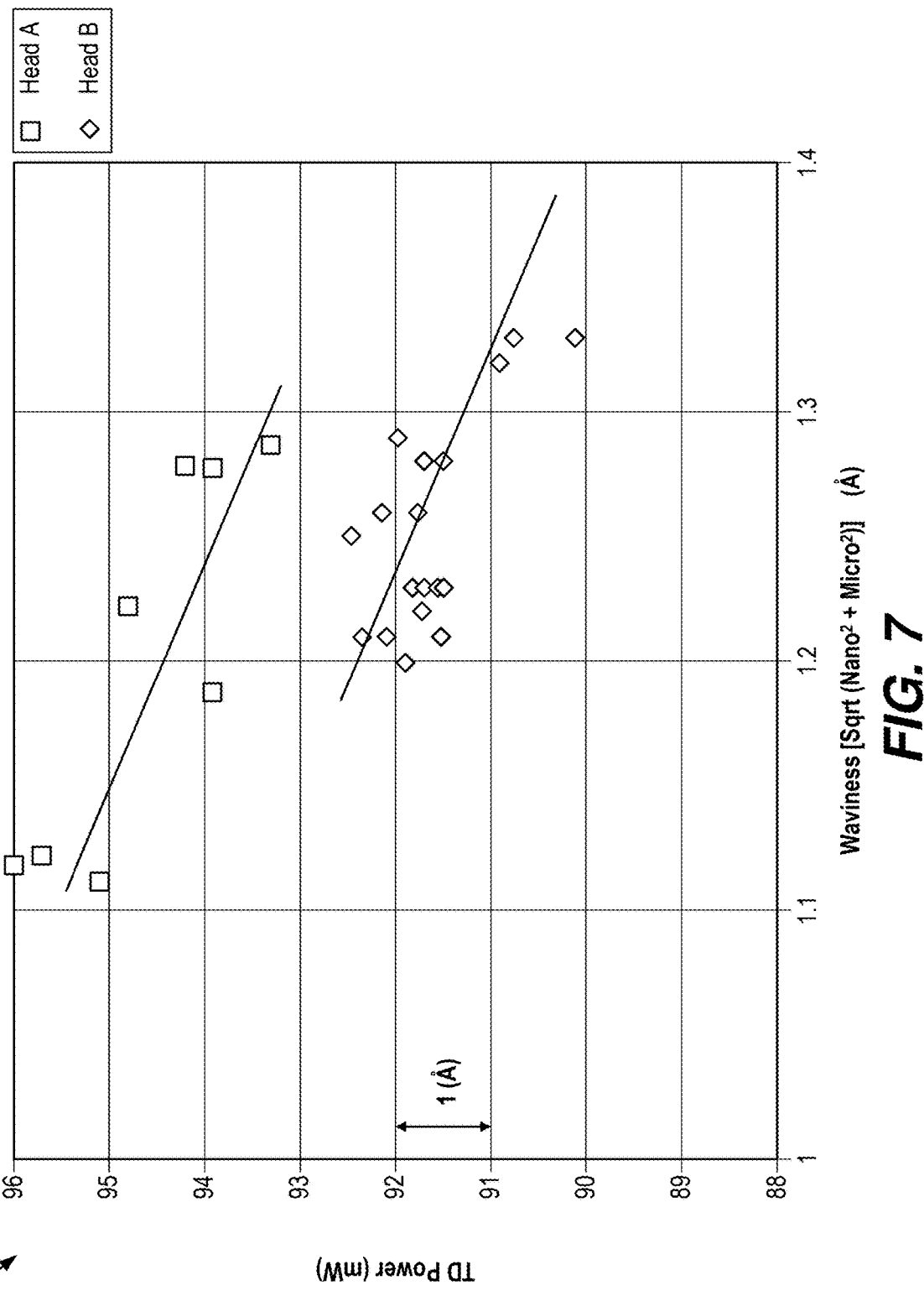
FIG. 7 shows an example plot of a touch-down (TD) power as a function of composite waviness for two types of slider heads, according to some aspects.

As described above, Waviness A values (e.g., nano-waviness values) within the first wavelength range and Waviness B values (e.g., micro-waviness values) within the second wavelength range are affected by different polishing steps. Therefore, for example, the information on the Waviness A values may be used to control or improve the second polishing step and the information on the Waviness B values may be used to control or improve the first polishing step. However, the Waviness A values cannot be used independently from and the Waviness B values, or vice versa, as an indicator for the head-disk interaction, such as touch down powers. Hence, according to some aspects of the disclosure, a composite waviness that considers both the Waviness A values and the Waviness B values may be used to examine the relationship of the waviness values and characteristics of FIG. 7 shows an example plot 700 of a touch-down (TD) power as a function of composite waviness for two types of slider heads, according to some aspects. As shown in FIG. 7, lower TD powers are used for higher composite waviness values, and thus TD powers are inversely proportional to the composite waviness values for the both types of slider heads. TD powers are used in a disk drive to set the spacing between a data surface of a magnetic recording disk and the read/write element on a slider head. Ideally, the TD powers should be determined for each sector or each track on the data surface. However, measuring composite waviness values or determining TD powers on various locations of an entire surface of a substrate is not practical, as making such a large number of measurements will be very time-consuming, where the substrate may be fabricated into the magnetic recording disk. Therefore, measuring composite waviness values and/or determining TD powers on a limited small portion of the surface of the substrate are more practical than making such measurements on all possible locations on the entire surface of the substrate. However, if the waviness is not uniform across the disk surface, a pre-selected TD power may not provide the optimum spacing for some portions of the data surface, and head-disk contact may occur in some portions of the data surface if the pre-selected TD power causes a spacing too narrow in those portions of the data surface.

Figure 8:
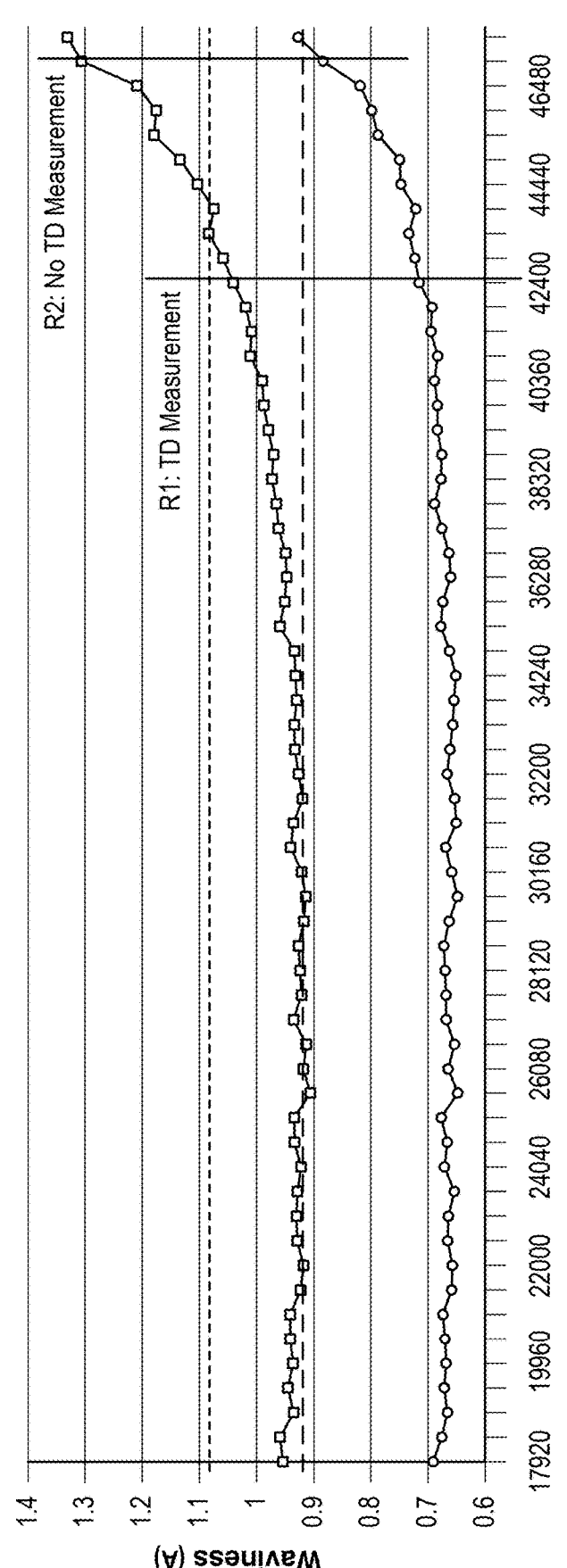
FIG. 8 shows an example plot of one-track average nano-waviness values and one-track average micro-waviness values across various positions in a radial direction on a surface of a substrate for use in a magnetic recording medium.
Figure 8:
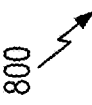

FIG. 8 shows an example plot 800 of one-track average nano-waviness values and one-track average micro-waviness values across various positions in a radial direction on a surface of a substrate for use in a magnetic recording medium. Each data point on the plot shows a one-track average of nano-waviness values and one-track average of micro-waviness values taken at a respective track on the surface of the substrate. For example, the one track average of nano-waviness values on the left side of the plot is based on nano-waviness values taken along a track at an ID region of the surface of the substrate and the one track average nano-waviness values on the right side of the plot is based on nano-waviness values taken along a track at an OD region of the surface of the substrate. As shown in FIG. 8, one-track average nano-waviness values and one-track average micro-waviness values are higher in the OD region. Further, one-track average nano-waviness values and one-track average micro-waviness values at radius R1 are lower than those at radius R2. Hence, after the substrate is fabricated into a magnetic recording disk, if the TD power is determined based on nano-waviness values and micro-waviness values at R1, and the same TD power is used at R2, the slider head is likely to contact a data surface of the magnetic recording disk. Therefore, with a large variation of waviness values on the surface of the substrate, the contact between the slider head and the data surface of the magnetic recording disk is more likely. Hence, a smaller variation in waviness values on the surface of the substrate is desired.

In an example, one-track average nano-waviness values and one-track average micro-waviness values may be calculated using the following equation using sampled height values at a particular radius. For a one-track average nano-waviness value at a particular radius, sampled height values at this particular radius may be filtered with the wavelength range between 20 micrometers and 250 micrometers and then the following equation may be used to calculate the one-track average nano-waviness value. For a one-track average micro-waviness value at a particular radius, sampled height values at this particular radius may be filtered with the wavelength range between 80 micrometers and 500 micrometers and then the following equation may be used to calculate the one-track average micro-waviness value.

$$Wa = \frac{1}{N} \sum_{i=1}^{N} |Z_i - Z_a|$$

In the above equation, $Z_a$ is the mean height value of the sampled height values, $Z_i$ is the height of the $i^{th}$ sampled height value, and N is the total number of sampled height values.

As explained above, it is advantageous to have smaller composite waviness values and smaller variations of composite waviness values on the surface of a substrate. Hence, experiments can be performed to determine various conditions for a composite waviness value and a variation of composite waviness values. According to some aspects of the disclosure, one or more of several conditions may be considered to determine a substrate suitable for use within a magnetic medium of a magnetic data storage device configured for magnetic recording.

According to an aspect of the disclosure, one or more conditions are considered to identify a substrate suitable for use within a magnetic medium of a data storage device configured for magnetic recording, where the one or more conditions are associated with composite waviness values. For example, an apparatus may perform various actions to identify a suitable substrate that satisfies the one or more conditions associated with the composite waviness values. These conditions are described in detail below in the discussion of FIG. 9A. To determine whether the substrate satisfies the one or more conditions, composite waviness values are calculated for a limited portion of the surface on the substrate. For example, this surface on the substrate may correspond to a data surface after processing the substrate to form a magnetic recording medium. In particular, the apparatus determines first waviness values representative of surface waviness of a surface of a substrate within a first wavelength range, at multiple locations, respectively, on the surface, and also determines second waviness values representative of surface waviness of the surface of the substrate within a second wavelength range, at the multiple locations, respectively, the second wavelength range being different from the first wavelength range. Then, composite waviness values respectively for the multiple locations on the surface are calculated based on the first waviness values and the second waviness values.

In an aspect, the first waviness values may be representative of waviness within the first wavelength range along a first track on the surface of the substrate, and the second waviness values may be representative of waviness within the second wavelength range along a second, different track on the surface of the substrate. In this aspect, the substrate may have an inner diameter edge and an outer diameter edge, where the first track is a circular path on the surface near the inner diameter edge, and the second track is a circular path on the surface near the outer diameter edge.

In an aspect, to determine the first waviness values, the apparatus may determine a first set of nano-waviness values at first locations, respectively, along a first track on a surface of the substrate, and also may determine a second set of nano-waviness values at second locations, respectively, along a second track on the surface. Further, in an aspect, to determine the second waviness values, the apparatus may determine a first set of micro-waviness values at the first locations, respectively, on the surface of the substrate, and also may determine a second set of micro-waviness values at the second locations, respectively, on the surface. As discussed above, nano-waviness values are determined within the first wavelength range and micro-waviness values are determined within the second wavelength range, where a lower limit and an upper limit of the second wavelength range are higher than a lower limit and an upper limit of the first wavelength range, respectively. In some aspects, the first wavelength range may be between 20 micrometers and 250 micrometers, inclusive, and the second wavelength range may be between 80 micrometers and 500 micrometers, inclusive.

In an aspect, to calculate the composite waviness values, a first set of composite waviness values respectively for the first locations are calculated based on the first set of nano-waviness values and the first set of micro-waviness values. Further, to calculate the composite waviness values, a second set of composite waviness values respectively for the second locations are calculated based on the second set of nano-waviness values and the second set of micro-waviness values. In some aspects, the first set of composite waviness values may be calculated by calculating a square root of a sum of a square of a respective nano-waviness value of the first set of nano-waviness values and a square of a respective micro-waviness value of the first set of micro-waviness values, according to Equation [1] as shown above. In some aspects, the second set of composite waviness values may be calculated by calculating a square root of a sum of a square of a respective nano-waviness value of the second set of nano-waviness values and a square of a respective micro-waviness value of the second set of micro-waviness values, according to Equation [1] as shown above.

After calculating the composite waviness values, the apparatus may determine whether each of the one or more conditions associated with the composite waviness values is satisfied. In an aspect, after calculating the composite waviness values that include the first set of composite waviness values and the second set of micro-waviness values, the apparatus may determine whether each of the one or more conditions associated with the first set of composite waviness values and the second set of composite waviness values is satisfied. If each of the one or more conditions is satisfied, the apparatus determines to utilize the substrate for the magnetic medium (that is, the apparatus selects the substrate for use as in a magnetic recording disk). If at least one of the one or more conditions is not satisfied, then apparatus determines that the substrate is not suitable for the magnetic medium and thus such a substrate may be discarded (that is, the substrate is rejected).

Figures 9A, 9B:
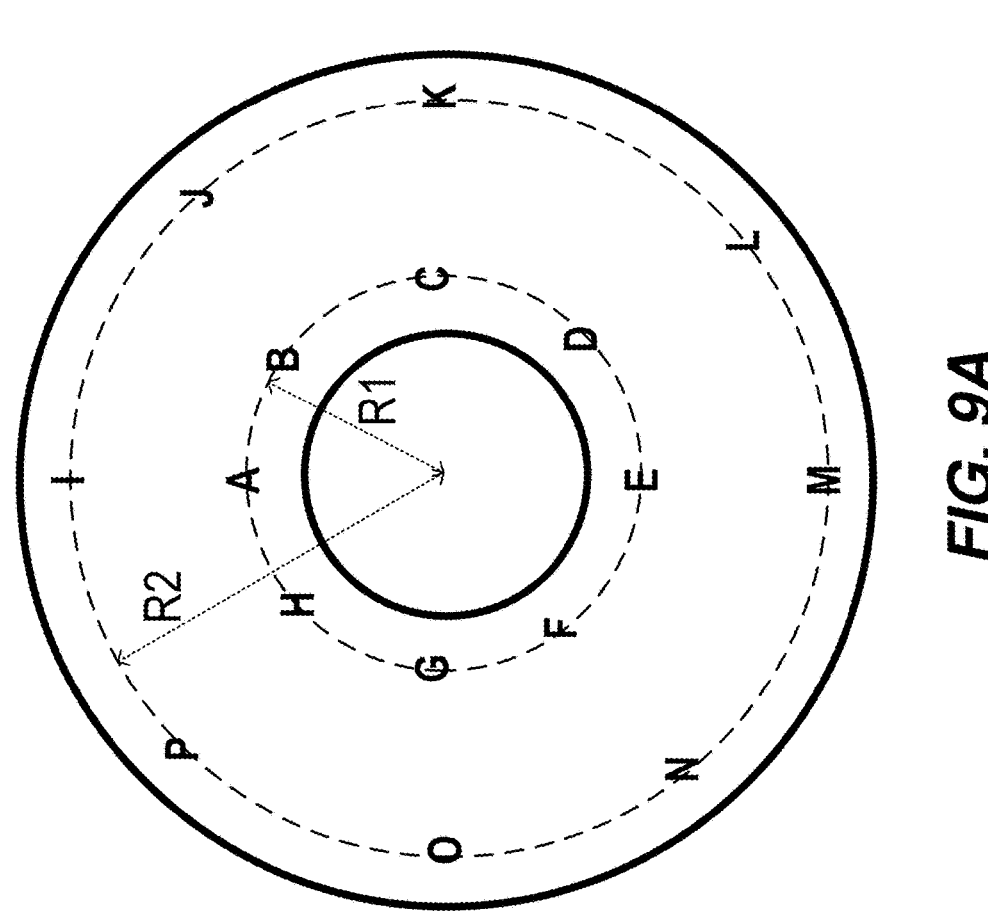
FIG. 9A is an example diagram showing various locations along a first track on a surface for which waviness values are obtained and various locations along a second track on the surface for which waviness values are obtained, according to some aspects.
FIG. 9B is an example table showing waviness values from a substrate in an experiment, according to some aspects.

FIG. 9A is an example diagram 900 showing various locations along a first track on a surface for which waviness values are obtained and various locations along a second track on the surface for which waviness values are obtained, according to some aspects. In FIG. 9, along a first track with a radius R1, a respective nano-waviness value is determined at each of 8 locations A, B, C, D, E, F, G, H to form a first set of nano-waviness values and a respective micro-waviness value is determined at each of the 8 locations A, B, C, D, E, F, G, H to form a first set of micro-waviness values. The first track may be a circular path on the surface in an ID region, near an inner diameter edge. For each of the 8 locations A, B, C, D, E, F, G, H, a respective composite waviness value may be calculated by calculating a square root of a sum of a square of a respective nano-waviness value and a square of a respective micro-waviness value, according to the Equation [1] described above. For example, a composite waviness value for the location A may be calculated by calculating a square root of a sum of a square of a nano-waviness value at the location A and a square of a micro-waviness value at the location A, according to the Equation [1] described above. In other words, Composite Waviness Value at Location A may be calculated according to the following equation:

$$\text{Composite Waviness at } A = \sqrt{(NanoWaviness \text{ at } A)^2 + (MicroWaviness \text{ at } A)^2}$$

The composite waviness values for the other 7 locations B, C, D, E, F, G, H along the first track may be calculated similarly. The 8 composite waviness values for the 8 locations A, B, C, D, E, F, G, H, respectively, form a second set of composite waviness values.

Further, along a second track with a radius R2, a respective nano-waviness value is determined at each of 8 locations I, J, K, L, M, N, O, P to form a second set of nano-waviness values and a respective micro-waviness value is determined at each of the 8 locations A I, J, K, L, M, N, O, P to form a second set of micro-waviness values. The second track may be a circular path on the surface in an OD region, near an outer diameter edge. For each of the 8 locations I, J, K, L, M, N, O, P, a respective composite waviness value may be calculated by calculating a square root of a sum of a square of a respective nano-waviness value and a square of a respective micro-waviness value, according to the Equation [1] described above. For example, a composite waviness value for the location A may be calculated by calculating a square root of a sum of a square of a nano-waviness value at the location I and a square of a micro-waviness value at the location I, according to the Equation [1] described above. In other words, Composite Waviness Value at Location I may be calculated according to the following equation:

$$\text{Composite Waviness at } I = \sqrt{(NanoWaviness \text{ at } I)^2 + (MicroWaviness \text{ at } I)^2}$$

The composite waviness values for the other 7 locations J, K, L, M, N, O, P along the second track may be calculated similarly. The 8 composite waviness values for the 8 locations I, J, K, L, M, N, O, P, respectively, form a second set of composite waviness values. Although the example in FIG. 9 shows calculations at 8 locations along the first track and 8 locations along the second track, another example may perform calculations at more than 8 locations or less than 8 locations per track.

With regard to the conditions associated with the first set of composite waviness values and the second set of composite waviness values, there may be at least four conditions associated with the first set and the second set of composite waviness values, including a first condition, a second condition, a third condition, and a fourth condition. The first condition is each of the first set of composite waviness values and the second set of composite waviness values being less than a composite waviness threshold. In an aspect, the composite waviness threshold may be 1.42 Angstrom. Hence, if all of the composite waviness values calculated are less than composite waviness threshold, the first condition is satisfied. The second condition is a difference between a first average value of the first set of composite waviness values and a second average value of the second set of composite waviness values being less than a difference threshold. In an aspect, the difference threshold may be 0.1 Angstrom. Exemplary third and fourth conditions are described below.

The one or more conditions may include any combination of the first, second, third, and fourth conditions. For example, in one scenario, the one or more conditions may include only the first condition. In another example, the one or more conditions may include only the first and second conditions. In another example, the one or more conditions may include only the first and third conditions or only the first and fourth conditions. In another example, the one or more conditions may include only the third and fourth conditions. In another example, one or more conditions may include the first, second, third, and fourth conditions.

According to one aspect, the one or more conditions may include the first condition, and thus if the first condition is satisfied, the apparatus determines to utilize the substrate for the magnetic medium. For example, if each of the first set of composite waviness values and the second set of composite waviness values is less than the composite waviness threshold (e.g., 1.42 Angstrom), the apparatus determines to utilize the substrate for the magnetic medium. According to another aspect, the one or more condition may include the first condition and the second condition, and thus if both the first condition and the second condition, the apparatus determines to utilize the substrate for the magnetic medium. For example, if each of the first set of composite waviness values and the second set of composite waviness values is less than the composite waviness threshold (e.g., 1.42 Angstrom), and if a difference between a first average value of the first set of composite waviness values and a second average value of the second set of composite waviness values is less than the difference threshold (e.g., 0.1 Angstrom), the apparatus determines to utilize the substrate for the magnetic medium.

FIG. 9B is an example table 950 showing waviness values from a substrate in an experiment, according to some aspects. In the example shown in FIG. 9B, nano-waviness values in Angstroms are determined at the 8 locations A, B, C, D, E, F, G, H, respectively, to form a first set of nano-waviness values and micro-waviness values are determined at the 8 locations A, B, C, D, E, F, G, H, respectively, to form a first set of micro-waviness values. Further, nano-waviness values are determined in Angstroms at the 8 locations I, J, K, L, M, N, O, P, respectively, to form a second set of nano-waviness values and micro-waviness values are determined at the 8 locations I, J, K, L, M, N, O, P, respectively, to form a second set of micro-waviness values. Then, the composite waviness values are calculated using the nano-waviness values and the micro-waviness values, as discussed above. In the example shown in FIG. 9B, the composite waviness values for the locations A and B are 1.599 Angstrom and 1.530 Angstrom, which are greater than the composite waviness threshold of 1.42 Angstrom, and thus the substrate does not satisfy the first condition. Further, in the example shown in FIG. 9B, a first average value of the first set of composite waviness values is 1.37025 and a second average value of the second set of composite waviness values is 1.295875. Hence, a difference between the first average value and the second average value is 0.074375, which is less than 0.1 Angstrom, and thus the substrate satisfies the second condition. Therefore, if the one or more conditions include either the first condition or both the first and second conditions, the substrate of FIG. 9B does not satisfy the one or more conditions.

The third condition and the fourth condition are based on a statistical parameter such as a standard deviation. In one aspect using a statistical simulation approach, an average and a standard deviation are first calculated based on the first set of composite waviness values and the second set of composite waviness values. Based on the average and the standard deviation, a first set of simulated composite waviness values and a second set of simulated composite waviness values are generated using a statistical distribution. Here, the statistical distribution may be either a Gaussian distribution or a Weibull distribution. Then, simulated difference values are calculated by calculating differences between the first set of simulated composite waviness values and the second set of simulated composite waviness values, respectively. In an aspect, the first set of simulated composite waviness values and the second set of simulated composite waviness may be generated using a Monte-Carlo simulation.

In this aspect, the third condition is a portion of the simulated difference values with a value less than a first simulated difference threshold being more than 95% of a number of the simulated difference values. In an aspect, the first simulated difference threshold may be 0.2 Angstrom. For example, if there are 100 simulated difference values and more than 95 simulated difference values are less than the first simulated difference threshold of 0.2 Angstrom, the third condition is satisfied. The fourth condition is a portion of the simulated difference values with a value less than a second simulated difference threshold being more than 99% of a number of the simulated difference values. In an aspect, the second simulated difference threshold may be 0.4 Angstrom. For example, if there are 100 simulated difference values and more than 99 simulated difference values are less than the second simulated difference threshold of 0.4 Angstrom, the fourth condition is satisfied.

FIG. 10 is an example table 1000 showing simulated composite waviness values obtained using a statistical simulation approach, according to some aspects. In the example shown in FIG. 10, a first set of simulated composite waviness values (simulated composite waviness values at Point A) and a second set of simulated composite waviness values (simulated composite waviness values at Point B) are generated using the Gaussian distribution, using a Monte-Carlo simulation. A Box-Muller method is one of a method for the simulation. In the example of FIG. 10, among the 100 simulated difference values, only 81 simulated difference values are less than the first simulated difference threshold of 0.2 Angstrom, and thus the portion of the simulated difference values with a value less than the first simulated difference threshold of 0.2 Angstrom is less than 95% of a number of the simulated difference values. Therefore, according to the simulation in FIG. 10, the substrate does not satisfy the third condition. In the example of FIG. 10, among the 100 simulated difference values, 100 simulated difference values are less than the second simulated difference threshold 0.4 Angstrom. Therefore, according to the simulation in FIG. 10, the substrate does not satisfy the fourth condition.

Figure 11:
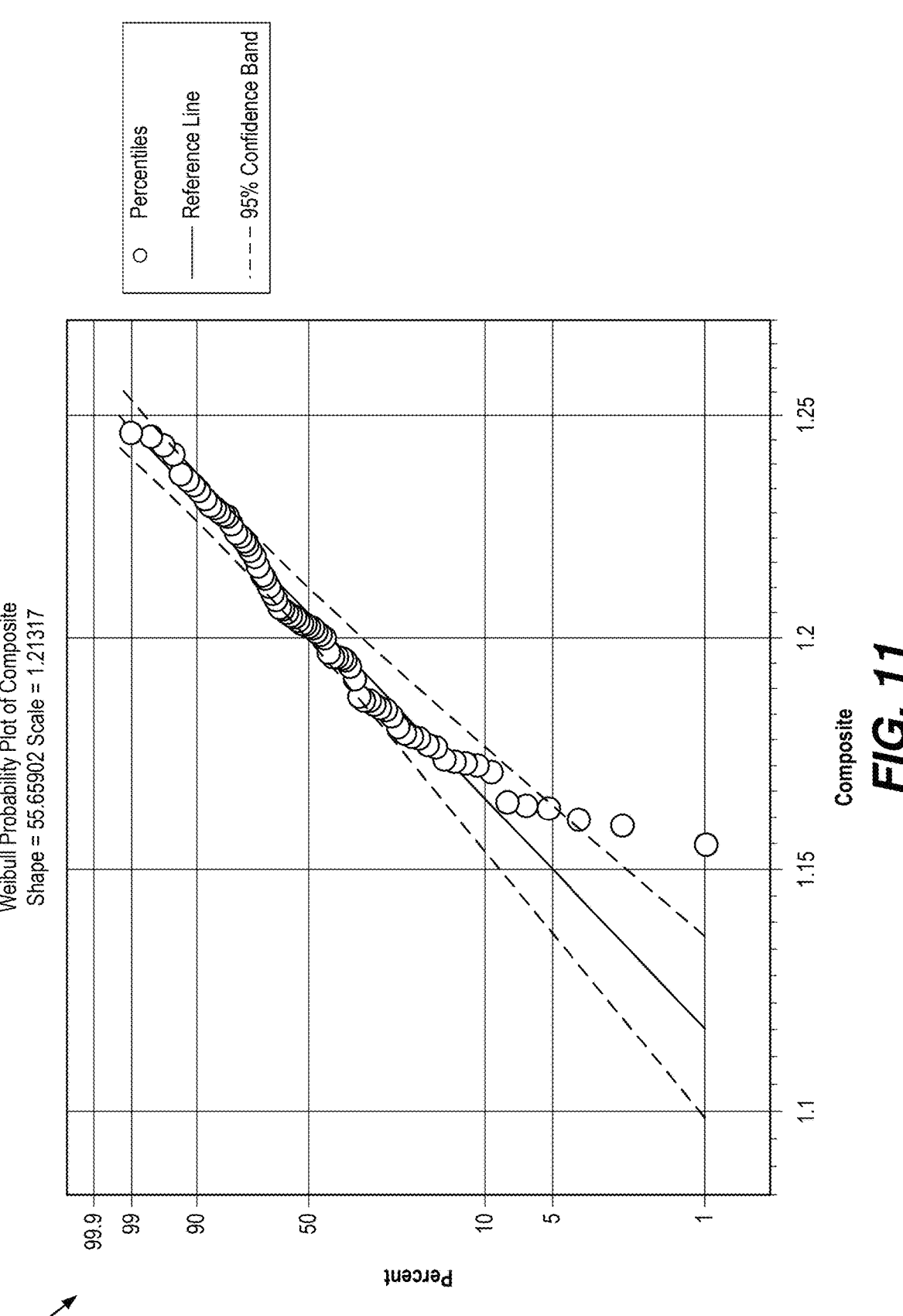
FIG. 11 is an example plot illustrating percentages of simulated composite waviness values that have values less than particular composite waviness values, according to some aspects.

FIG. 11 is an example plot 1100 illustrating percentages of simulated composite waviness values in Angstroms that have values less than particular composite waviness values, according to some aspects. The plot of FIG. 11 shows a percentage of composite waviness values that are less than a particular composite waviness value on the x-axis. For example, as shown in FIG. 11, 99% of the composite waviness values are less than 1.25 Angstrom. FIG. 11 also shows a reference line showing a center of the distribution. Further, FIG. 11 shows 95% confidence lines showing the range of the probability with the 95% of the confidence level. For example, 95% of unknow data points falls within the region between the dashed lines indicating the 95% confidence lines.

According to one aspect, the one or more conditions may include the third condition and/or the fourth condition, and thus if the third condition and/or the fourth condition are satisfied, the apparatus determines to utilize the substrate for the magnetic medium. For example, in a case where the one or more conditions includes the third condition, if a portion of the plurality of simulated difference values with a value less than the first simulated difference threshold of 0.2 Angstrom is more than 95% of a number of the plurality of simulated difference values, the apparatus determines to utilize the substrate for the magnetic medium. For example, in a case where the one or more conditions includes the fourth condition, if a portion of the plurality of simulated difference values with a value less than the second simulated difference threshold of 0.4 Angstrom is more than 99% of a number of the plurality of simulated difference values, the apparatus determines to utilize the substrate for the magnetic medium. For example, in a case where the one or more condition includes both the third condition and the fourth condition, the apparatus determines to utilize the substrate for the magnetic medium only if both the third condition and the fourth condition are satisfied.

According to one aspect, the one or more conditions may include the first condition, and may further include the third condition and/or the fourth condition. For example, in a case where the one or more conditions includes the first and third conditions, if each of the first set of composite waviness values and the second set of composite waviness values is less than the composite waviness threshold of 1.42 Angstrom and if a portion of the plurality of simulated difference values with a value less than the first simulated difference threshold of 0.2 Angstrom is more than 95% of a number of the plurality of simulated difference values, the apparatus determines to utilize the substrate for the magnetic medium. For example, in a case where the one or more conditions includes the first and fourth conditions, if each of the first set of composite waviness values and the second set of composite waviness values is less than the composite waviness threshold of 1.42 Angstrom and if a portion of the plurality of simulated difference values with a value less than the second simulated difference threshold of 0.4 Angstrom is more than 99% of a number of the plurality of simulated difference values, the apparatus determines to utilize the substrate for the magnetic medium. For example, in a case where the one or more condition includes the first, third, and fourth conditions, the apparatus determines to utilize the substrate for the magnetic medium only if all of the first, third, and fourth conditions are satisfied.

In another aspect using an analytical approach, a standard deviation is first calculated based on the first set of composite waviness values and the second set of composite waviness values. For the analytical approach, the third condition is satisfied when a portion of expected difference values between any two of expected composite waviness values with a value less than 0.2 Angstrom is more than 95% of a number of the expected difference values. The standard deviation of the first set and second set of composite waviness values is compared against a standard deviation value corresponding to a 95% of a statistical distribution to determine whether the portion of the expected difference values with a value less than 0.2 Angstrom is more than 95% of a number of the expected difference values. Further, for the analytical approach, the fourth condition is satisfied when a portion of the expected difference values between any two of expected composite waviness values with a value less than 0.4 Angstrom being more than 99% of the number of the expected difference values. The standard deviation of the first set and second set of composite waviness values is compared against a standard deviation value corresponding to a 99% of a statistical distribution to determine whether the portion of the expected difference values with a value less than 0.4 Angstrom is more than 99% of a number of the expected difference values.

The analytical approach is developed according to the following deduction. An expected absolute value of a normally-distributed (e.g., with the Gaussian distribution) random variable $$X \sim N\left(0, \sigma_X^2\right)$$

may be expressed as follows:

$$E[|X|] = \sigma_X \sqrt{\frac{2}{\pi}}$$

The difference $\Delta$ also follows the normal distribution with the standard deviation of the difference $\Delta$ expressed as $\sigma_\Delta = \sqrt{2} \cdot \sigma$. Then, the expected value of an absolute value of the difference $\Delta$ may be expressed as follows:

$$E[|\Delta|] = \sigma_\Delta \cdot \sqrt{2} \cdot \sigma \cdot \sqrt{\frac{2}{\pi}} = \sigma \cdot \sqrt{\frac{4}{\pi}} \approx \sigma \cdot 1.128$$

Because we are considering the absolute value of the difference $\Delta$, the distribution is a folded normal distribution. For the folded normal distribution, the standard deviation of the absolute value of the difference $\Delta$ may be expressed as follows:

$$Std(|\Delta|) = \sigma_\Delta \cdot \sqrt{1 - \frac{2}{\pi}}$$

By substituting $\sigma_\Delta = \sqrt{2} \cdot \sigma$ into the formula for $Std(|\Delta|)$ above, the following formula may be obtained:

$$Std(|\Delta|) = \sqrt{2} \cdot \sigma \cdot \sqrt{1 - \frac{2}{\pi}} \approx 0.852 \cdot \sigma$$

With regard to the third condition, according to the analytical approach, a first expected standard deviation value $\sigma 1$ based on a 95% point of a statistical distribution may be obtained using the following equation, which is deduced using the formulas described above.

$$(1.128 + \sigma_{95\%} \times 0.852)\sigma 1 = 0.2 \qquad \text{Equation [2]}$$

Here, $\sigma_{95}\%$ is a 95% point standard deviation within which 95% of the total population is included. The 95% point standard deviation of a statistical distribution that is a Gaussian distribution is 1.96. The standard deviation of the composite waviness values needs to be less than the first expected standard deviation value $\sigma 1$ to satisfy the third condition.

For example, referring back to FIG. 9B, the standard deviation of the first set and the second set of composite waviness values is 0.106. In this example, the standard deviation of the first set and the second set of composite waviness values is greater than the first expected standard deviation value of 0.071 and thus the substrate of FIG. 9B does not satisfy the third condition, according to the analytical approach.

With regard to the fourth condition, a second expected standard deviation value $\sigma 2$ based on a 99% point of a statistical distribution may be obtained using the equation, which is deduced using the formulas described above.

$$(1.128 + \sigma_{99\%} \times 0.852)\sigma 2 = 0.2 \qquad \text{Equation [3]}$$

Here, $\sigma_{99}\%$ is a 99% point standard deviation within which 99% of the total population is included. The 99% point standard deviation of a statistical distribution that is a Gaussian distribution is 2.576. The standard deviation of the composite waviness values needs to be less than the second expected standard deviation value $\sigma 2$ to satisfy the fourth condition. If the statistical distribution is the Gaussian distribution, the second expected standard deviation value $\sigma 2$ is 0.120.

For example, referring back to FIG. 9B, the standard deviation of the first set and the second set of composite waviness values is 0.106. In this example, the standard deviation of the first set and the second set of composite waviness values is less than the second expected standard deviation value of 0.120 and thus the substrate of FIG. 9B satisfies the fourth condition, according to the analytical approach.

Hence, according to the analytical approach, with regard to the third condition, the portion of the expected difference values with the value less than 0.2 Angstrom is more than 95% of a number of the expected difference values when the standard deviation is less than a first expected standard deviation value, the first expected standard deviation value being based on a 95% point standard deviation of a statistical distribution and 0.2 Angstrom. Further, according to the analytical approach, with regard to the fourth condition, the portion of the plurality of expected difference values with the value less than 0.4 Angstrom is more than 99% of a number of the plurality of expected difference values when the standard deviation is less than a second expected standard deviation value, the second expected standard deviation value being based on a 99% point standard deviation of the statistical distribution and 0.4 Angstrom. In an aspect, the first expected standard deviation value may be calculated by dividing 0.2 by a sum of 1.128 and a product of the 95% point standard deviation of the statistical distribution and 0.852, and the second expected standard deviation value may be calculated by dividing 0.4 by a sum of 1.128 and a product of the 99% point standard deviation of the statistical distribution and 0.852.

According to an aspect of the disclosure, a substrate satisfying particular the condition(s) discussed above is provided for use in a magnetic recording medium. In particular, the substrate for use in the magnetic recording medium includes a surface including physical characteristics including composite waviness values determined for multiple locations on the surface, each of the composite waviness values being less than a composite waviness threshold. In an aspect, the composite waviness threshold may be 1.42 Angstrom. Here, the composite waviness values are based on first waviness values and second waviness values, where the first waviness values are representative of surface waviness of the surface within a first wavelength range, at the multiple locations, respectively, and the second waviness values are representative of surface waviness of the surface within a second wavelength range, at the multiple locations, respectively, the second wavelength range being different from the first wavelength range. In an aspect, the first wavelength range is between 20 micrometers and 250 micrometers, inclusive, and the second wavelength range is between 80 micrometers and 500 micrometers, inclusive.

In an aspect, each of the composite waviness values is representative of a square root of a sum of a square of a respective first waviness value of the first waviness values and a square of a respective second waviness value of the second waviness values In an aspect, the first waviness values are representative of waviness within the first wavelength range along a first track on the surface of the substrate, and the second waviness values are representative of waviness within the second wavelength range along a second, different track on the surface of the substrate. In an aspect, the substrate has an inner diameter edge and an outer diameter edge, where the first track is a circular path on the surface near the inner diameter edge, and the second track is a circular path on the surface near the outer diameter edge.

In an aspect, the first waviness values include a first set of nano-waviness values at multiple first locations, respectively, along a first track on the surface of the substrate, the first set of nano-waviness values being within the first wavelength range. In an aspect, the first waviness values further includes a second set of nano-waviness values at multiple second locations, respectively, along a second track on the surface of the substrate, the second set of nano-waviness values being within the first wavelength range.

In an aspect, the second waviness values include a first set of micro-waviness values at the multiple first locations, respectively, on the surface of the substrate, the first set of micro-waviness values being within the second wavelength range. In an aspect, the second waviness values further include a second set of micro-waviness values at the multiple second locations, respectively, on the surface of the substrate, the second set of micro-waviness values being within the second wavelength range.

In an aspect, the composite waviness values include a first set of composite waviness values respectively for the multiple first locations, first set of composite waviness values being based on the first set of nano-waviness values and the first set of micro-waviness values, and further include a second set of composite waviness values respectively for the multiple second locations, the second set of composite waviness values being based on the second set of nano-waviness values and the second set of micro-waviness values.

In an aspect, the first set of composite waviness values are based on a square root of a sum of a square of a respective nano-waviness value of the first set of nano-waviness values and a square of a respective micro-waviness value of the first set of micro-waviness values, and the second set of composite waviness values are based on a square root of a sum of a square of a respective nano-waviness value of the second set of nano-waviness values and a square of a respective micro-waviness value of the second set of micro-waviness values.

In an aspect, a difference between a first average value of the first set of composite waviness values and a second average value of the second set of composite waviness values being less than a difference threshold. In an aspect, the difference threshold is 0.1 Angstrom.

According to an aspect of the disclosure, a magnetic recording medium is provided the magnetic recording medium includes the substrate discussed above and a magnetic recording layer on the substrate and configured for magnetic recording is provided.

According to an aspect of the disclosure, a storage device is provided. The storage device includes at least one magnetic head, a magnetic recording medium including the substrate discussed above, a drive mechanism for positioning the at least one magnetic head over the magnetic recording medium, and a controller electrically coupled to the at least one magnetic head for controlling operation of the at least one magnetic head.

In an aspect, the storage device further includes a slider. In this aspect, the slider may include the at least one magnetic head, a laser configured to generate light, and a near field transducer (NFT) configured to receive the light and generate a localized heat, where the magnetic recording medium includes a heat sink layer configured to dissipate the localized heat during a writing process.

In an illustrative example, a magnetic storage device has multiple storage disks, each including a magnetic recording layer for magnetic recording, and at least one magnetic head configured to read from, and write to, the storage disks. In some aspects, each storage disk in the magnetic data storage device according to an aspect of the disclosure satisfies at least one of the one or more conditions associated with a first set of composite waviness values and a second set of composite waviness values. Here, the first set of composite waviness values for first locations, respectively, along a first track on a surface of a storage disk are based on a first set of nano-waviness values and a first set of micro-waviness values at the first locations, respectively, and the second set of composite waviness values for second locations, respectively, along a second track on the surface are based on the second set of nano-waviness values and the second set of micro-waviness values at the second locations, respectively. As discussed above, nano-waviness values are within a first wavelength range and micro-waviness values are within a second wavelength range, where a lower limit and an upper limit of the second wavelength range are higher than a lower limit and an upper limit of the first wavelength range, respectively.

In a magnetic storage device according to one aspect, each storage disk satisfies at least the first condition. In a magnetic storage device according to another aspect, each storage disk satisfies at least the first condition and the second condition.

Figure 12:
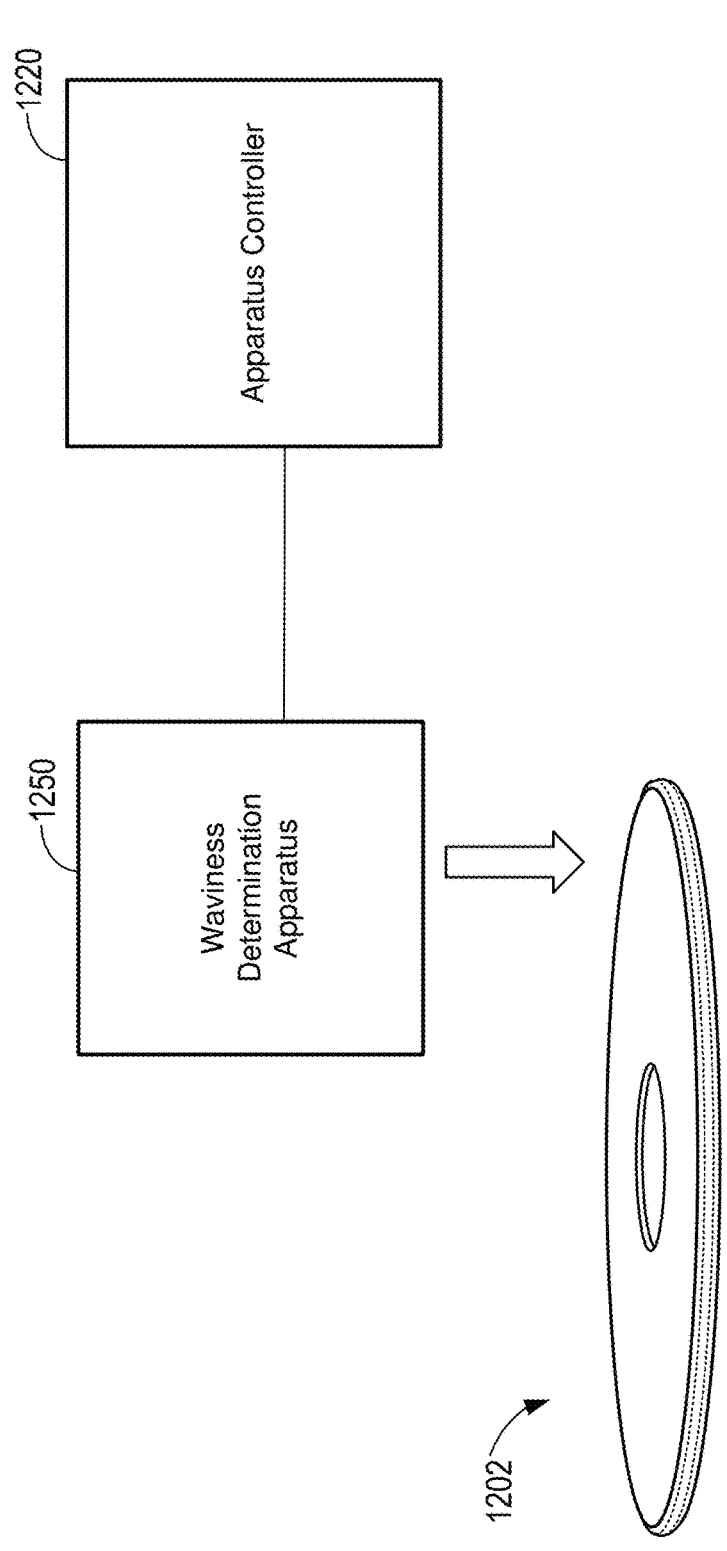
FIG. 12 illustrates an exemplary diagram for an apparatus for identifying a glass substrate suitable for a magnetic medium of a data storage device configured for magnetic recording, according to some aspects.

FIG. 12 illustrates an exemplary diagram for an apparatus 1200 for identifying a glass substrate suitable for a magnetic medium of a data storage device configured for magnetic recording, according to some aspects. In FIG. 12, the apparatus 1200 may include an apparatus controller 1220 and a waviness determination apparatus 1250. In particular, the waviness determination apparatus 1250 is configured to determine nano-waviness values and/or micro-waviness values on a surface of a substrate 1202. In some aspects, the waviness determination apparatus 1250 may determine a first set of nano-waviness values at first locations, respectively, along a first track on the surface, the first set of nano-waviness values being within a first wavelength range, and may determine a first set of micro-waviness values at the first locations, respectively, on the surface, the first set of micro-waviness values being within a second wavelength range. In some aspects, the waviness determination apparatus 1250 may determine a second set of nano-waviness values at a plurality of second locations, respectively, along a second track on the surface, the second set of nano-waviness values being within the first wavelength range, and determine a second set of micro-waviness values at the plurality of second locations, respectively, on the surface, the second set of micro-waviness values being within the second wavelength range. The apparatus controller 1220 is configured to calculate a first set of composite waviness values respectively for the plurality of first locations based on the first set of nano-waviness values and the first set of micro-waviness values, and to calculate a second set of composite waviness values respectively for the plurality of second locations based on the second set of nano-waviness values and the second set of micro-waviness values. The apparatus controller 1220 is further configured to determine utilize the substrate for the magnetic medium in response to satisfying each of one or more conditions associated with the first set of composite waviness values and the second set of composite waviness values.

In some aspects, the apparatus controller 1220 is configured to calculate an average and a standard deviation based on the first set of composite waviness values and the second set of composite waviness values, generate a first set of simulated composite waviness values based on the average and the standard deviation and based on a statistical distribution, the statistical distribution being either a Gaussian distribution or a Weibull distribution, generate a second set of simulated composite waviness values based on the average and the standard deviation and based on the statistical distribution, and calculate a plurality of simulated difference values by calculating differences between the first set of simulated composite waviness values and the second set of simulated composite waviness values, respectively.

FIG. 13 illustrates a method 1300 for identifying a substrate suitable for a magnetic medium of a data storage device configured for magnetic recording, according to some aspects. In some aspects, the method 1300 may be performed by an apparatus for identifying a substrate suitable for a magnetic medium of a data storage device configured for magnetic recording, such as the apparatus 1200 of FIG. 12.

At block 1305, the apparatus determines a plurality of first waviness values representative of surface waviness of a surface of a substrate within a first wavelength range, at a plurality of locations, respectively, on the surface.

In an aspect, determining the plurality of first waviness values at block 1305 may include: determining a first set of nano-waviness values at a plurality of first locations, respectively, along a first track on the surface of the substrate, the first set of nano-waviness values being within the first wavelength range, and determining a second set of nano-waviness values at a plurality of second locations, respectively, along a second track on the surface of the substrate, the second set of nano-waviness values being within the first wavelength range.

At block 1310, the apparatus determines a plurality of second waviness values representative of surface waviness of the surface of the substrate within a second wavelength range, at the plurality of locations, respectively, the second wavelength range being different from the first wavelength range. In an aspect, the first wavelength range may be between 20 micrometers and 250 micrometers, inclusive, and the second wavelength range may be between 80 micrometers and 500 micrometers, inclusive.

In an aspect, determining the plurality of second waviness values at block 1310 includes: determining a first set of micro-waviness values at the plurality of first locations, respectively, on the surface of the substrate, the first set of micro-waviness values being within the second wavelength range, and determining a second set of micro-waviness values at the plurality of second locations, respectively, on the surface of the substrate, the second set of micro-waviness values being within the second wavelength range.

In an aspect, the plurality of first waviness values may be representative of waviness within the first wavelength range along a first track on the surface of the substrate, and the plurality of second waviness values may be representative of waviness within the second wavelength range along a second, different track on the surface of the substrate. In an aspect, the substrate may have an inner diameter edge and an outer diameter edge, where the first track may be a circular path on the surface near the inner diameter edge, and the second track may be a circular path on the surface near the outer diameter edge.

At block 1315, the apparatus calculates a plurality of composite waviness values respectively for the plurality of locations based on the plurality of first waviness values and the plurality of second waviness values.

In an aspect, calculating the plurality of composite waviness values at block 1315 includes calculating a first set of composite waviness values respectively for the plurality of first locations based on the first set of nano-waviness values and the first set of micro-waviness values, and calculating a second set of composite waviness values respectively for the plurality of second locations based on the second set of nano-waviness values and the second set of micro-waviness values. In this aspect, the calculating the first set of composite waviness values comprises calculating a square root of a sum of a square of a respective nano-waviness value of the first set of nano-waviness values and a square of a respective micro-waviness value of the first set of micro-waviness values, and the calculating the second set of composite waviness values comprises calculating a square root of a sum of a square of a respective nano-waviness value of the second set of nano-waviness values and a square of a respective micro-waviness value of the second set of micro-waviness values.

In an aspect, at block 1320, the apparatus may calculate an average and a standard deviation based on the plurality of composite waviness values.

In an aspect, at block 1325, the apparatus may generate a first set of simulated composite waviness values based on the average and the standard deviation and based on a statistical distribution, the statistical distribution being either a Gaussian distribution or a Weibull distribution.

In an aspect, at block 1330, the apparatus may generate a second set of simulated composite waviness values based on the average and the standard deviation and based on the statistical distribution.

In an aspect, at block 1335, the apparatus may calculate a plurality of simulated difference values by calculating differences between the first set of simulated composite waviness values and the second set of simulated composite waviness values, respectively.

At block 1340, the apparatus determines to utilize the substrate for the magnetic medium in response to satisfying each of one or more conditions associated with the plurality of composite waviness values, where the one or more conditions includes: each of the plurality of composite waviness values being less than a composite waviness threshold. In an aspect, the composite waviness threshold is 1.42 Angstrom.

In an aspect, the one or more conditions may include: each of the first set of composite waviness values and the second set of composite waviness values being less than the composite waviness threshold, and/or a difference between a first average value of the first set of composite waviness values and a second average value of the second set of composite waviness values being less than a difference threshold. In this aspect, the difference threshold may be 0.1 Angstrom.

In an aspect, the difference threshold is 0.1 Angstrom may include at least one of: each of the plurality of composite waviness values being less than the composite waviness threshold, and a portion of the plurality of simulated difference values with a value less than a first simulated difference threshold being more than 95% of a number of the plurality of simulated difference values, or each of the plurality of composite waviness values being less than the composite waviness threshold, and a portion of the plurality of simulated difference values with a value less than a second simulated difference threshold being more than 99% of a number of the plurality of simulated difference values. In this aspect, the first simulated difference threshold may be 0.2 Angstrom and the second simulated difference threshold may be 0.4 Angstrom.

In an aspect, the first set of simulated composite waviness values and the second set of simulated composite waviness values are generated using a Monte-Carlo simulation.

FIG. 14 illustrates a method 1400 for identifying a substrate suitable for a magnetic medium of a data storage device configured for magnetic recording, according to some aspects. In some aspects, the method 1400 may be performed by an apparatus for identifying a substrate suitable for a magnetic medium of a data storage device configured for magnetic recording, such as the apparatus 1200 of FIG. 12.

At block 1405, the apparatus determines a plurality of first waviness values representative of surface waviness of a surface of a substrate within a first wavelength range, at a plurality of locations, respectively, on the surface.

In an aspect, determining the plurality of first waviness values at block 1405 may include: determining a first set of nano-waviness values at a plurality of first locations, respectively, along a first track on the surface of the substrate, the first set of nano-waviness values being within the first wavelength range; and determining a second set of nano-waviness values at a plurality of second locations, respectively, along a second track on the surface of the substrate, the second set of nano-waviness values being within the first wavelength range.

At block 1410, the apparatus determines a plurality of second waviness values representative of surface waviness of the surface of the substrate within a second wavelength range, at the plurality of locations, respectively, the second wavelength range being different from the first wavelength range. In an aspect, the first wavelength range is between 20 micrometers and 250 micrometers, and the second wavelength range is between 80 micrometers and 500 micrometers.

In an aspect, determining the plurality of second waviness values at block 1410 may include: determining a first set of micro-waviness values at the plurality of first locations, respectively, on the surface of the substrate, the first set of micro-waviness values being within the second wavelength range; and determining a second set of micro-waviness values at the plurality of second locations, respectively, on the surface of the substrate, the second set of micro-waviness values being within the second wavelength range.

At block 1415, the apparatus calculates a plurality of composite waviness values respectively for the plurality of locations based on the plurality of first waviness values and the plurality of second waviness values. In an aspect, each of the plurality of composite waviness values is representative of a square root of a sum of a square of a respective first waviness value of the plurality of first waviness values and a square of a respective second waviness value of the plurality of second waviness values.

In an aspect, the calculating the plurality of composite waviness values at block 1415 may include: calculating a first set of composite waviness values respectively for the plurality of first locations based on the first set of nano-waviness values and the first set of micro-waviness values, and calculating a second set of composite waviness values respectively for the plurality of second locations based on the second set of nano-waviness values and the second set of micro-waviness values. In an aspect, the calculating the first set of composite waviness values may include calculating a square root of a sum of a square of a respective nano-waviness value of the first set of nano-waviness values and a square of a respective micro-waviness value of the first set of micro-waviness values. In an aspect, the calculating the second set of composite waviness values may include calculating a square root of a sum of a square of a respective nano-waviness value of the second set of nano-waviness values and a square of a respective micro-waviness value of the second set of micro-waviness values.

At block 1420, the apparatus calculates an average and a standard deviation based on the plurality of composite waviness values.

At block 1425, the apparatus generates a first set of simulated composite waviness values based on the average and the standard deviation and based on a statistical distribution, the statistical distribution being either a Gaussian distribution or a Weibull distribution.

At block 1430, the apparatus generates a second set of simulated composite waviness values based on the average and the standard deviation and based on the statistical distribution.

At block 1435, the apparatus calculates a plurality of simulated difference values by calculating differences between the first set of simulated composite waviness values and the second set of simulated composite waviness values, respectively.

At block 1440, the apparatus determines to utilize the substrate for the magnetic medium in response to satisfying each of one or more conditions associated with the plurality of composite waviness values, where the one or more conditions comprise at least one of: a portion of the plurality of simulated difference values with a value less than a first simulated difference threshold being more than 95% of a number of the plurality of simulated difference values, or a portion of the plurality of simulated difference values with a value less than a second simulated difference threshold being more than 99% of a number of the plurality of simulated difference values. In an aspect, the first simulated difference threshold is 0.2 Angstrom and the second simulated difference threshold is 0.2 Angstrom.

In an aspect, the one or more conditions may include at least one of: each of the plurality of composite waviness values being less than a composite waviness threshold, and the portion of the plurality of simulated difference values with the value less than the first simulated difference threshold being more than 95% of the number of the plurality of simulated difference values; or each of the plurality of composite waviness values being less than the composite waviness threshold, and the portion of the plurality of simulated difference values with the value less than the second simulated difference threshold being more than 99% of the number of the plurality of simulated difference values. In an aspect, the composite waviness threshold is 1.42 Angstrom.

In an aspect, the first waviness values are representative of waviness within the first wavelength range along a first track on the surface of the substrate, and the second waviness values are representative of waviness within the second wavelength range along a second, different track on the surface of the substrate. In an aspect, the substrate has an inner diameter edge and an outer diameter edge, and wherein the first track is a circular path on the surface near the inner diameter edge, and wherein the second track is a circular path on the surface near the outer diameter edge.

In an aspect, the one or more conditions may include: a difference between a first average value of the first set of composite waviness values and a second average value of the second set of composite waviness values being less than a difference threshold, and the portion of the plurality of simulated difference values with the value less than the first simulated difference threshold being more than 95% of the number of the plurality of simulated difference values, or the difference between the first average value of the first set of composite waviness values and the second average value of the second set of composite waviness values being less than a difference threshold, and the portion of the plurality of simulated difference values with the value less than the second simulated difference threshold being more than 99% of the number of the plurality of simulated difference values. In an aspect, the difference threshold is 0.1 Angstrom.

In an aspect, the first set of simulated composite waviness values and the second set of simulated composite waviness values are generated using a Monte-Carlo simulation.

FIG. 15A illustrates a method 1500 for identifying a substrate suitable for a magnetic medium of a data storage device configured for magnetic recording, according to some aspects. In some aspects, the method 1500 may be performed by an apparatus for identifying a substrate suitable for a magnetic medium of a data storage device configured for magnetic recording, such as the apparatus 1200 of FIG. 12.

At block 1505, the apparatus determines a plurality of first waviness values representative of surface waviness of a surface of a substrate within a first wavelength range. In an aspect, the plurality of first waviness values are representative of waviness within the first wavelength range along a first track on the surface of the substrate.

In an aspect, the determining the plurality of first waviness values at block 1505 may include: determining a first set of nano-waviness values at a plurality of first locations, respectively, along a first track on the surface of the substrate, the first set of nano-waviness values being within the first wavelength range, and determining a second set of nano-waviness values at a plurality of second locations, respectively, along a second track on the surface of the substrate, the second set of nano-waviness values being within the first wavelength range.

At block 1510, the apparatus determines a plurality of second waviness values representative of surface waviness of the surface of the substrate within a second, different wavelength range. In an aspect, the first wavelength range is between 20 micrometers and 250 micrometers, inclusive, and the second wavelength range is between 80 micrometers and 500 micrometers, inclusive. In an aspect, the plurality of second waviness values are representative of waviness within the second wavelength range along a second, different track on the surface of the substrate.

In an aspect, the determining the plurality of second waviness values at block 1510 may include: determining a first set of micro-waviness values at the plurality of first locations, respectively, on the surface of the substrate, the first set of micro-waviness values being within the second wavelength range, and determining a second set of micro-waviness values at the plurality of second locations, respectively, on the surface of the substrate, the second set of micro-waviness values being within the second wavelength range.

At block 1515, the apparatus combines the plurality of first waviness values and the plurality of second waviness values into a plurality of composite waviness values. In an aspect, the plurality of composite waviness values are representative of a square root of a sum of a square of the plurality of first waviness values and a square of the plurality of second waviness values.

In an aspect, the combining the plurality of first waviness values and the plurality of second waviness values into the plurality of composite waviness values at block 1515 may include: calculating a first set of composite waviness values respectively for the plurality of first locations based on the first set of nano-waviness values and the first set of micro-waviness values, and calculating a second set of composite waviness values respectively for the plurality of second locations based on the second set of nano-waviness values and the second set of micro-waviness values. In an aspect, the calculating the first set of composite waviness values comprises calculating a square root of a sum of a square of a respective nano-waviness value of the first set of nano-waviness values and a square of a respective micro-waviness value of the first set of micro-waviness values, and the calculating the second set of composite waviness values comprises calculating a square root of a sum of a square of a respective nano-waviness value of the second set of nano-waviness values and a square of a respective micro-waviness value of the second set of micro-waviness values.

At block 1520, the apparatus determines whether the plurality of composite waviness values are less than a composite waviness threshold.

In an aspect, the determining whether the plurality of composite waviness values are less than the composite waviness threshold at block 1520 may include determining whether each of the first set of composite waviness values and the second set of composite waviness values are less than the composite waviness threshold.

In an aspect, the substrate has an inner diameter edge and an outer diameter edge, and wherein the first track is a circular path on the surface near the inner diameter edge, and wherein the second track is a circular path on the surface near the outer diameter edge.

FIG. 15B illustrates a method 1550 for identifying a substrate suitable for a magnetic medium of a data storage device configured for magnetic recording, according to some aspects. The method in FIG. 15B is continued from the method described in FIG. 15A. In some aspects, the method 1550 may be performed by an apparatus for identifying a substrate suitable for a magnetic medium of a data storage device configured for magnetic recording, such as the apparatus 1200 of FIG. 12.

In an aspect, at block 1555, the apparatus may calculate an average and a standard deviation based on the plurality of composite waviness values.

In an aspect, at block 1560, the apparatus may generate a first set of simulated composite waviness values based on the average and the standard deviation and based on a statistical distribution, the statistical distribution being either a Gaussian distribution or a Weibull distribution.

In an aspect, at block 1565, the apparatus may generate a second set of simulated composite waviness values based on the average and the standard deviation and based on the statistical distribution.

In an aspect, at block 1570, the apparatus may calculate a plurality of simulated difference values by calculating differences between the first set of simulated composite waviness values and the second set of simulated composite waviness values, respectively.

At block 1575, the apparatus selects the substrate for use within a magnetic recording medium in response to a determination that the plurality of composite waviness values are less than the composite waviness threshold. In an aspect, the composite waviness threshold is 1.42 Angstrom.

In an aspect, the selecting the substrate for use within the magnetic recording medium at block 1575 may include selecting the substrate for use within a magnetic recording medium in response to the determination that the composite waviness values are less than the composite waviness threshold and a determination that a difference between a first average value of the first set of composite waviness values and a second average value of the second set of composite waviness values is less than a difference threshold. In an aspect, the difference threshold is 0.1 Angstrom.

At block 1580, the apparatus rejects the substrate in response to a determination that the plurality of composite waviness values are greater than or equal to the composite waviness threshold.

In an aspect, the selecting the substrate for use within the magnetic recording medium at block 1575 may include selecting the substrate for use within a magnetic recording medium in response to at least one of: the determination that the composite waviness values are less than the composite waviness threshold and a determination that a portion of the plurality of simulated difference values with a value less than a first simulated difference threshold is more than 95% of a number of the plurality of simulated difference values, or the determination that the composite waviness values are less than the composite waviness threshold and a determination that a portion of the plurality of simulated difference values with a value less than a first simulated difference threshold is more than 95% of a number of the plurality of simulated difference values. In an aspect, the first simulated difference threshold is 0.2 Angstrom and the second simulated difference threshold is 0.4 Angstrom. In an aspect, the first set of simulated composite waviness values and the second set of simulated composite waviness values are generated using a Monte-Carlo simulation.

FIG. 16A illustrates a method 1600 for identifying a glass substrate suitable for a magnetic medium of a data storage device configured for magnetic recording, according to some aspects. In some aspects, the method 1600 may be performed by an apparatus for identifying a glass substrate suitable for a magnetic medium of a data storage device configured for magnetic recording, such as the apparatus 1200 of FIG. 12.

At block 1605, the apparatus determines a first set of nano-waviness values at a plurality of first locations, respectively, along a first track on a surface of the substrate, the first set of nano-waviness values being within a first wavelength range.

At block 1610, the apparatus determines a first set of micro-waviness values at the plurality of first locations, respectively, on the surface, the first set of micro-waviness values being within a second wavelength range, wherein a lower limit and an upper limit of the second wavelength range are higher than a lower limit and an upper limit of the first wavelength range, respectively.

In some aspects, the first wavelength range may be between 20 micrometers and 250 micrometers, and the second wavelength range may be between 80 micrometers and 500 micrometers.

At block 1615, the apparatus determines a second set of nano-waviness values at a plurality of second locations, respectively, along a second track on the surface, the second set of nano-waviness values being within the first wavelength range.

In some aspects, the first track on the surface may be a circular path on the surface in an inner diameter region near an inner diameter edge, and the second track on the surface may be a circular path on the surface in an outer diameter region near an outer diameter edge.

At block 1620, the apparatus determines a second set of micro-waviness values at the plurality of second locations, respectively, on the surface, the second set of micro-waviness values being within the second wavelength range.

At block 1625, the apparatus calculates a first set of composite waviness values respectively for the plurality of first locations based on the first set of nano-waviness values and the first set of micro-waviness values.

In some aspects, the calculating the first set of composite waviness values at block 1625 may comprise calculating a square root of a sum of a square of a respective nano-waviness value of the first set of nano-waviness values and a square of a respective micro-waviness value of the first set of micro-waviness values.

At block 1630, the apparatus calculates a second set of composite waviness values respectively for the plurality of second locations based on the second set of nano-waviness values and the second set of micro-waviness values.

In some aspects, the calculating the second set of composite waviness values at block 1630 may comprise calculating a square root of a sum of a square of a respective nano-waviness value of the second set of nano-waviness values and a square of a respective micro-waviness value of the second set of micro-waviness values.

Additional features performed by the apparatus are described below with reference to FIG. 16B.

FIG. 16B illustrates a method 1650 for identifying a glass substrate suitable for a magnetic medium of a data storage device configured for magnetic recording, according to some aspects. The method in FIG. 16B is continued from the method described in FIG. 16A. In some aspects, the method 1650 may be performed by an apparatus for identifying a glass substrate suitable for a magnetic medium of a data storage device configured for magnetic recording, such as the apparatus 1200 of FIG. 12.

In some aspects, at block 1655, the apparatus may calculate an average and a standard deviation based on the first set of composite waviness values and the second set of composite waviness values.

In some aspects, at block 1660, the apparatus may generate a first set of simulated composite waviness values based on the average and the standard deviation and based on a statistical distribution, the statistical distribution being either a Gaussian distribution or a Weibull distribution.

In some aspects, at block 1665, the apparatus may generate a second set of simulated composite waviness values based on the average and the standard deviation and based on the statistical distribution.

In some aspects, the first set of simulated composite waviness values and the second set of simulated composite waviness may be generated using a Monte-Carlo simulation.

In some aspects, at block 1670, the apparatus may calculate a plurality of simulated difference values by calculating differences between the first set of simulated composite waviness values and the second set of simulated composite waviness values, respectively.

In some aspects, at block 1675, the apparatus may calculate a standard deviation based on both the first set of composite waviness values and the second set of composite waviness values.

At block 1680, the apparatus determines to utilize the substrate for the magnetic medium in response to satisfying each of one or more conditions associated with the first set of composite waviness values and the second set of composite waviness values, where the one or more conditions comprise each of the first set of composite waviness values and the second set of composite waviness values being less than 1.42 Angstrom.

In some aspects, the one or more conditions may comprise: each of the first set of composite waviness values and the second set of composite waviness values being less than 1.42 Angstrom, and a difference between a first average value of the first set of composite waviness values and a second average value of the second set of composite waviness values being less than 0.1 Angstrom.

In some aspects, the one or more conditions may comprise: each of the first set of composite waviness values and the second set of composite waviness values being less than 1.42 Angstrom, and a portion of the plurality of simulated difference values with a value less than 0.2 Angstrom being more than 95% of a number of the plurality of simulated difference values; or the one or more conditions may comprise: each of the first set of composite waviness values and the second set of composite waviness values being less than 1.42 Angstrom, and a portion of the plurality of simulated difference values with a value less than 0.4 Angstrom being more than 99% of a number of the plurality of simulated difference values.

In some aspects, the one or more conditions may comprise: each of the first set of composite waviness values and the second set of composite waviness values being less than 1.42 Angstrom, and a portion of the plurality of expected difference values between any two of a plurality of expected composite waviness values with a value less than 0.2 Angstrom being more than 95% of a number of the plurality of expected difference values; or the one or more conditions may comprise each of the first set of composite waviness values and the second set of composite waviness values being less than 1.42 Angstrom, and a portion of the plurality of expected difference values between any two of a plurality of expected composite waviness values with a value less than 0.4 Angstrom being more than 99% of the number of the plurality of expected difference values. In this aspect, the portion of the plurality of expected difference values with the value less than 0.2 Angstrom is more than 95% of a number of the plurality of expected difference values when the standard deviation is less than a first expected standard deviation value, the first expected standard deviation value being based on a 95% point standard deviation of a statistical distribution and 0.2 Angstrom, the statistical distribution being either a Gaussian distribution or a Weibull distribution. In this aspect, the portion of the plurality of expected difference values with the value less than 0.4 Angstrom is more than 99% of a number of the plurality of expected difference values when the standard deviation is less than a second expected standard deviation value, the second expected standard deviation value being based on a 99% point standard deviation of the statistical distribution and 0.4 Angstrom. In some aspects, the first expected standard deviation value may be calculated by dividing 0.2 by a sum of 1.128 and a product of the 95% point standard deviation of the statistical distribution and 0.852, and the second expected standard deviation value may be calculated by dividing 0.4 by a sum of 1.128 and a product of the 99% point standard deviation of the statistical distribution and 0.852.

FIG. 17A illustrates a method 1700 for identifying a glass substrate suitable for a magnetic medium of a data storage device configured for magnetic recording, according to some aspects. In some aspects, the method 1700 may be performed by an apparatus for identifying a glass substrate suitable for a magnetic medium of a data storage device configured for magnetic recording, such as the apparatus 1200 of FIG. 12.

At block 1705, the apparatus determines a first set of nano-waviness values at a plurality of first locations, respectively, along a first track on a surface of the substrate, the first set of nano-waviness values being within a first wavelength range.

At block 1710, the apparatus determines a first set of micro-waviness values at the plurality of first locations, respectively, on the surface, the first set of micro-waviness values being within a second wavelength range, wherein a lower limit and an upper limit of the second wavelength range are higher than a lower limit and an upper limit of the first wavelength range, respectively.

In some aspects, the first wavelength range may be between 20 micrometers and 250 micrometers, and the second wavelength range may be between 80 micrometers and 500 micrometers.

At block 1715, the apparatus determines a second set of nano-waviness values at a plurality of second locations, respectively, along a second track on the surface, the second set of nano-waviness values being within the first wavelength range.

In some aspects, the first track on the surface may be a circular path on the surface in an inner diameter region near an inner diameter edge, and the second track on the surface may be a circular path on the surface in an outer diameter region near an outer diameter edge.

At block 1720, the apparatus determines a second set of micro-waviness values at the plurality of second locations, respectively, on the surface, the second set of micro-waviness values being within the second wavelength range.

At block 1725, the apparatus calculates a first set of composite waviness values respectively for the plurality of first locations based on the first set of nano-waviness values and the first set of micro-waviness values.

In some aspects, the calculating the first set of composite waviness values at block 1725 may comprise calculating a square root of a sum of a square of a respective nano-waviness value of the first set of nano-waviness values and a square of a respective micro-waviness value of the first set of micro-waviness values.

At block 1730, the apparatus calculates a second set of composite waviness values respectively for the plurality of second locations based on the second set of nano-waviness values and the second set of micro-waviness values.

In some aspects, the calculating the second set of composite waviness values at block 1730 may comprise calculating a square root of a sum of a square of a respective nano-waviness value of the second set of nano-waviness values and a square of a respective micro-waviness value of the second set of micro-waviness values.

Additional features performed by the apparatus are described below with reference to FIG. 17B.

FIG. 17B illustrates a method 1750 for identifying a glass substrate suitable for a magnetic medium of a data storage device configured for magnetic recording, according to some aspects. The method in FIG. 17B is continued from the method described in FIG. 17A. In some aspects, the method 1750 may be performed by an apparatus for identifying a glass substrate suitable for a magnetic medium of a data storage device configured for magnetic recording, such as the apparatus 1200 of FIG. 12.

At block 1755, the apparatus calculates an average and a standard deviation based on the first set of composite waviness values and the second set of composite waviness values.

At block 1760, the apparatus generates a first set of simulated composite waviness values based on the average and the standard deviation and based on a statistical distribution, the statistical distribution being either a Gaussian distribution or a Weibull distribution.

At block 1765, the apparatus generates a second set of simulated composite waviness values based on the average and the standard deviation and based on the statistical distribution.

In some aspects, the first set of simulated composite waviness values and the second set of simulated composite waviness may be generated using a Monte-Carlo simulation.

At block 1770, the apparatus calculates a plurality of simulated difference values by calculating differences between the first set of simulated composite waviness values and the second set of simulated composite waviness values, respectively.

At block 1775, the apparatus determines to utilize the substrate for the magnetic medium in response to satisfying each of one or more conditions associated with the first set of composite waviness values and the second set of composite waviness values, where the one or more conditions comprise at least one of: a portion of the plurality of simulated difference values with a value less than 0.2 Angstrom being more than 95% of a number of the plurality of simulated difference values, or a portion of the plurality of simulated difference values with a value less than 0.4 Angstrom being more than 99% of a number of the plurality of simulated difference values.

In an aspect, the one or more conditions may comprise at least one of: the portion of the plurality of simulated difference values with the value less than 0.2 Angstrom being more than 95% of the number of the plurality of simulated difference values, and each of the first set of composite waviness values and the second set of composite waviness values being less than 1.42 Angstrom, or the portion of the plurality of simulated difference values with the value less than 0.4 Angstrom being more than 99% of the number of the plurality of simulated difference values, and each of the first set of composite waviness values and the second set of composite waviness values being less than 1.42 Angstrom.

In an aspect, the one or more conditions may comprise at least one of: the portion of the plurality of simulated difference values with the value less than 0.2 Angstrom being more than 95% of the number of the plurality of simulated difference values, and a difference between a first average value of the first set of composite waviness values and a second average value of the second set of composite waviness values being less than 0.1 Angstrom, or the portion of the plurality of simulated difference values with the value less than 0.4 Angstrom being more than 99% of the number of the plurality of simulated difference values, and a difference between a first average value of the first set of composite waviness values and a second average value of the second set of composite waviness values being less than 0.1 Angstrom.

FIGS. 13-17 illustrate the methods in varying scopes. For example, the method shown in FIG. 13 and the method shown in FIG. 15 are more simplified versions of the method shown in FIGS. 16A and 16B. The method shown in FIG. 14 is a more simplified version of the method shown in FIGS. 17A and 17B.

Additional Aspects

The examples set forth herein are provided to illustrate certain concepts of the disclosure. The apparatuses, devices, or components illustrated above may be configured to perform one or more of the methods, features, or steps described herein. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Aspects of the present disclosure have been described above with reference to schematic flowchart diagrams and/ or schematic block diagrams of methods, apparatuses, systems, and computer program products according to aspects of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

The subject matter described herein may be implemented in hardware, software, firmware, or any combination thereof. As such, the terms "function," "module," and the like as used herein may refer to hardware, which may also include software and/or firmware components, for implementing the feature being described. In one example implementation, the subject matter described herein may be implemented using a computer readable medium having stored thereon computer executable instructions that when executed by a computer (e.g., a processor) control the computer to perform the functionality described herein. Examples of computer-readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding aspects. For instance, an arrow may indicate a waiting or monitoring period of unspecified duration between enumerated steps of the depicted aspect.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example aspects. The example systems and components described herein may be configured differently than described. For example, elements may be added to, removed from, or rearranged compared to the disclosed example aspects.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

While the above descriptions contain many specific aspects of the invention, these should not be construed as limitations on the scope of the invention, but rather as examples of specific aspects thereof. Accordingly, the scope of the invention should be determined not by the aspects illustrated, but by the appended claims and their equivalents. Moreover, reference throughout this specification to "one aspect," "an aspect," or similar language means that a particular feature, structure, or characteristic described in connection with the aspect is included in at least one aspect of the present disclosure. Thus, appearances of the phrases "in one aspect," "in an aspect," and similar language throughout this specification may, but do not necessarily, all refer to the same aspect, but mean "one or more but not all aspects" unless expressly specified otherwise.

The terminology used herein is for the purpose of describing particular embodiments only and is not intended to be limiting of the embodiments. As used herein, the singular forms "a," "an" and "the" are intended to include the plural forms as well (i.e., one or more), unless the context clearly indicates otherwise. An enumerated listing of items does not imply that any or all of the items are mutually exclusive and/or mutually inclusive, unless expressly specified otherwise. It will be further understood that the terms "comprises," "comprising," "includes" "including," "having," and variations thereof when used herein mean "including but not limited to" unless expressly specified otherwise. That is, these terms may specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may include one or more elements. In addition, terminology of the form "at least one of a, b, or c" or "a, b, c, or any combination thereof" used in the description or the claims means "a or b or c or any combination of these elements." For example, this terminology may include a, or b, or c, or a and b, or a and c, or a and b and c, or 2a, or 2b, or 2c, or 2a and b, and so on. The term "about 'value X'", or "approximately value X," as used in the disclosure shall mean within 10 percent of the 'value X'. For example, a value of about 1 or approximately 1, would mean a value in a range of 0.9-1.1. In one aspect, "about" as used herein may instead mean 5 percent. In this disclosure, various numerical values are presented. Unless specifically indicated otherwise, it is contemplated that these numerical values may have a tolerance of 10 percent. In another aspect, the tolerance may be 5 percent. In the disclosure various ranges in values may be specified, described and/or claimed. It is noted that any time a range is specified, described and/or claimed in the specification and/or claim, it is meant to include the endpoints (at least in one embodiment). In another embodiment, the range may not include the endpoints of the range. Various components described in this specification may be described as "including" or made of certain materials or compositions of materials. In one aspect, this can mean that the component consists of the particular material(s). In another aspect, this can mean that the component comprises the particular material(s).

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

What is claimed is:

1. A substrate for use in a magnetic recording medium, the substrate comprising:
   a surface comprising physical characteristics including a plurality of composite waviness values determined for a plurality of locations on the surface, each of the plurality of composite waviness values being less than a composite waviness threshold,
   wherein the plurality of composite waviness values are based on a combination of a plurality of first waviness values and a plurality of second waviness values, the plurality of first waviness values being representative of surface waviness of the surface within a first wavelength range, at the plurality of locations, respectively, and the plurality of second waviness values being representative of surface waviness of the surface within a second wavelength range, at the plurality of locations, respectively, the second wavelength range being different from the first wavelength range.

2. The substrate of claim 1, wherein the composite waviness threshold is 1.42 Angstrom.

3. The substrate of claim 1, wherein the first wavelength range is between 20 micrometers and 250 micrometers, inclusive, and the second wavelength range is between 80 micrometers and 500 micrometers, inclusive.

4. The substrate of claim 1, wherein each of the plurality of composite waviness values is representative of a square root of a sum of a square of a respective first waviness value of the plurality of first waviness values and a square of a respective second waviness value of the plurality of second waviness values.

5. The substrate of claim 1, wherein the plurality of first waviness values are representative of waviness within the first wavelength range along a first track on the surface of the substrate, and wherein the plurality of second waviness values are representative of waviness within the second wavelength range along a second, different track on the surface of the substrate.

6. The substrate of claim 5, wherein the substrate has an inner diameter edge and an outer diameter edge, and wherein the first track is a circular path on the surface near the inner diameter edge, and wherein the second track is a circular path on the surface near the outer diameter edge.

7. The substrate of claim 1, wherein the first waviness values comprise:

a first set of nano-waviness values at a plurality of first locations, respectively, along a first track on the surface of the substrate, the first set of nano-waviness values being within the first wavelength range; and
   a second set of nano-waviness values at a plurality of second locations, respectively, along a second track on the surface of the substrate, the second set of nano-waviness values being within the first wavelength range.

8. The substrate of claim 7, wherein the second waviness values comprise:
   a first set of micro-waviness values at the plurality of first locations, respectively, on the surface of the substrate, the first set of micro-waviness values being within the second wavelength range; and
   a second set of micro-waviness values at the plurality of second locations, respectively, on the surface of the substrate, the second set of micro-waviness values being within the second wavelength range.

9. The substrate of claim 8, wherein the plurality of composite waviness values comprise:
   a first set of composite waviness values respectively for the plurality of first locations, first set of composite waviness values being based on the first set of nano-waviness values and the first set of micro-waviness values; and
   a second set of composite waviness values respectively for the plurality of second locations, the second set of composite waviness values being based on the second set of nano-waviness values and the second set of micro-waviness values.

10. The substrate of claim 9, wherein the first set of composite waviness values are based on a square root of a sum of a square of a respective nano-waviness value of the first set of nano-waviness values and a square of a respective micro-waviness value of the first set of micro-waviness values, and
   wherein the second set of composite waviness values are based on a square root of a sum of a square of a respective nano-waviness value of the second set of nano-waviness values and a square of a respective micro-waviness value of the second set of micro-waviness values.

11. The substrate of claim 9, wherein a difference between a first average value of the first set of composite waviness values and a second average value of the second set of composite waviness values being less than a difference threshold.

12. The substrate of claim 11, wherein the difference threshold is 0.1 Angstrom.

13. A magnetic recording medium, comprising:
   the substrate of claim 1; and
   a magnetic recording layer on the substrate and configured for magnetic recording.

14. A data storage device, comprising:
   at least one magnetic head;
   a magnetic recording medium including the substrate of claim 1;
   a drive mechanism for positioning the at least one magnetic head over the magnetic recording medium; and
   a controller electrically coupled to the at least one magnetic head for controlling operation of the at least one magnetic head.

15. The data storage device of claim 14, further comprising a slider comprising:
   the at least one magnetic head;
   a laser configured to generate light; and

39 a near field transducer (NFT) configured to receive the
light and generate a localized heat,
wherein the magnetic recording medium comprises a heat
sink layer configured to dissipate the localized heat
during a writing process.
16. A method of identifying a substrate suitable for use
within a magnetic medium of a data storage device config-
ured for magnetic recording, comprising:
determining a plurality of first waviness values represen-
tative of surface waviness of a surface of a substrate
within a first wavelength range, at a plurality of loca-
tions, respectively, on the surface;
determining a plurality of second waviness values repre-
sentative of surface waviness of the surface of the
substrate within a second wavelength range, at the
plurality of locations, respectively, the second wave-
length range being different from the first wavelength
range;
calculating a plurality of composite waviness values
respectively for the plurality of locations based on a
combination of the plurality of first waviness values
and the plurality of second waviness values; and
determining to utilize the substrate for the magnetic
medium in response to satisfying each of one or more
conditions associated with the plurality of composite
waviness values,
wherein the one or more conditions comprises:
each of the plurality of composite waviness values
being less than a composite waviness threshold.
17. The method of claim 16, wherein the composite
waviness threshold is 1.42 Angstrom, and
wherein the first wavelength range is between 20 microm-
eters and 250 micrometers, inclusive, and the second
wavelength range is between 80 micrometers and 500
micrometers, inclusive.
18. The method of claim 16, wherein the plurality of first
waviness values are representative of waviness within the
first wavelength range along a first track on the surface of the
substrate, and wherein the plurality of second waviness
values are representative of waviness within the second
wavelength range along a second, different track on the
surface of the substrate, and
wherein the substrate has an inner diameter edge and an
outer diameter edge, and wherein the first track is a
circular path on the surface near the inner diameter
edge, and wherein the second track is a circular path on
the surface near the outer diameter edge.
19. The method of claim 16, wherein the determining the
plurality of first waviness values comprises:
determining a first set of nano-waviness values at a
plurality of first locations, respectively, along a first
track on the surface of the substrate, the first set of
nano-waviness values being within the first wavelength
range; and
determining a second set of nano-waviness values at a
plurality of second locations, respectively, along a
second track on the surface of the substrate, the second
set of nano-waviness values being within the first
wavelength range, and
wherein the determining the plurality of second waviness
values comprises:
determining a first set of micro-waviness values at the
plurality of first locations, respectively, on the surface
of the substrate, the first set of micro-waviness values
being within the second wavelength range; and
determining a second set of micro-waviness values at the
plurality of second locations, respectively, on the surface of the substrate, the second set of micro-waviness
values being within the second wavelength range.
20. The method of claim 19, wherein the calculating the
plurality of composite waviness values comprises:
calculating a first set of composite waviness values
respectively for the plurality of first locations based on
the first set of nano-waviness values and the first set of
micro-waviness values; and
calculating a second set of composite waviness values
respectively for the plurality of second locations based
on the second set of nano-waviness values and the
second set of micro-waviness values,
wherein the calculating the first set of composite waviness
values comprises calculating a square root of a sum of
a square of a respective nano-waviness value of the first
set of nano-waviness values and a square of a respec-
tive micro-waviness value of the first set of micro-
waviness values, and
wherein the calculating the second set of composite
waviness values comprises calculating a square root of
a sum of a square of a respective nano-waviness value
of the second set of nano-waviness values and a square
of a respective micro-waviness value of the second set
of micro-waviness values.
21. The method of claim 20, wherein the one or more
conditions comprise:
each of the first set of composite waviness values and the
second set of composite waviness values being less
than the composite waviness threshold; and
a difference between a first average value of the first set
of composite waviness values and a second average
value of the second set of composite waviness values
being less than a difference threshold.
22. The method of claim 21, wherein the difference
threshold is 0.1 Angstrom.
23. The method of claim 16, further comprising:
calculating an average and a standard deviation based on
the plurality of composite waviness values;
generating a first set of simulated composite waviness
values based on the average and the standard deviation
and based on a statistical distribution, the statistical
distribution being either a Gaussian distribution or a
Weibull distribution;
generating a second set of simulated composite waviness
values based on the average and the standard deviation
and based on the statistical distribution; and
calculating a plurality of simulated difference values by
calculating differences between the first set of simu-
lated composite waviness values and the second set of
simulated composite waviness values, respectively,
wherein the one or more conditions comprise at least one
of:
each of the plurality of composite waviness values
being less than the composite waviness threshold,
and a portion of the plurality of simulated difference
values with a value less than a first simulated dif-
ference threshold being more than 95% of a number
of the plurality of simulated difference values; or
each of the plurality of composite waviness values
being less than the composite waviness threshold,
and a portion of the plurality of simulated difference
values with a value less than a second simulated
difference threshold being more than 99% of a
number of the plurality of simulated difference val-
ues, wherein the first simulated difference threshold is 0.2 Angstrom and the second simulated difference threshold is 0.4 Angstrom.

24. A method of identifying a substrate suitable for use within a magnetic medium of a data storage device configured for magnetic recording, comprising:

determining a plurality of first waviness values representative of surface waviness of a surface of a substrate within a first wavelength range, at a plurality of locations, respectively, on the surface;

determining a plurality of second waviness values representative of surface waviness of the surface of the substrate within a second wavelength range, at the plurality of locations, respectively, the second wavelength range being different from the first wavelength range;

calculating a plurality of composite waviness values respectively for the plurality of locations based on the plurality of first waviness values and the plurality of second waviness values;

calculating an average and a standard deviation based on the plurality of composite waviness values;

generating a first set of simulated composite waviness values based on the average and the standard deviation and based on a statistical distribution, the statistical distribution being either a Gaussian distribution or a Weibull distribution;

generating a second set of simulated composite waviness values based on the average and the standard deviation and based on the statistical distribution;

calculating a plurality of simulated difference values by calculating differences between the first set of simulated composite waviness values and the second set of simulated composite waviness values, respectively; and determining to utilize the substrate for the magnetic medium in response to satisfying each of one or more conditions associated with the plurality of composite waviness values, wherein the one or more conditions comprise at least one of:

a portion of the plurality of simulated difference values with a value less than a first simulated difference threshold being more than 95% of a number of the plurality of simulated difference values, or a portion of the plurality of simulated difference values with a value less than a second simulated difference threshold being more than 99% of a number of the plurality of simulated difference values.

25. A method for identifying a substrate suitable for use within a magnetic recording medium, the method comprising:

determining a plurality of first waviness values representative of surface waviness of a surface of a substrate within a first wavelength range;

determining a plurality of second waviness values representative of surface waviness of the surface of the substrate within a second, different wavelength range;

combining the plurality of first waviness values and the plurality of second waviness values into a plurality of composite waviness values;

determining whether the plurality of composite waviness values are less than a composite waviness threshold; and selecting the substrate for use within a magnetic recording medium in response to a determination that the plurality of composite waviness values are less than the composite waviness threshold; and rejecting the substrate in response to a determination that the plurality of composite waviness values are greater than or equal to the composite waviness threshold.

* * * * *